(12) United States Patent
Antao et al.

(10) Patent No.: US 11,105,922 B2
(45) Date of Patent: Aug. 31, 2021

(54) SONAR TRANSDUCER HAVING GEOMETRIC ELEMENTS

(71) Applicant: NAVICO HOLDING AS, Egersund (NO)

(72) Inventors: Barry Antao, Owasso, OK (US); Alan Proctor, Owasso, OK (US); Jayme Caspall, Tulsa, OK (US)

(73) Assignee: NAVICO HOLDING AS, Egersund (NO)

( * ) Notice: Subject to any disclaimer, the term of this patent is extended or adjusted under 35 U.S.C. 154(b) by 0 days.

(21) Appl. No.: 16/382,639

(22) Filed: Apr. 12, 2019

(65) Prior Publication Data

US 2019/0265354 A1     Aug. 29, 2019

Related U.S. Application Data

(63) Continuation-in-part of application No. 15/907,733, filed on Feb. 28, 2018, now Pat. No. 11,047,964.

(51) Int. Cl.
*G01S 15/89* (2006.01)
*G01S 7/521* (2006.01)
*G10K 11/00* (2006.01)

(52) U.S. Cl.
CPC .......... *G01S 15/8995* (2013.01); *G01S 7/521* (2013.01); *G01S 15/8902* (2013.01);
(Continued)

(58) Field of Classification Search
CPC .......... G01S 15/89; G01S 7/521; G01S 15/87; G01S 15/8918; G01S 15/8902; G01S 15/8995; G01S 15/8993; G10K 11/008
See application file for complete search history.

(56) References Cited

U.S. PATENT DOCUMENTS 4,641,291 A * 2/1987 Simmons, Sr. ...... G10K 11/346
310/26
5,053,781 A 10/1991 Milman
(Continued)

OTHER PUBLICATIONS

Humminbird 800c HD—900c HD Series Operations Manual © 2012 Johnson Outdoors Marine Electronics, Inc. All rights reserved.*
(Continued)

*Primary Examiner* — Isam A Alsomiri
*Assistant Examiner* — Amie M Ndure
(74) *Attorney, Agent, or Firm* — Nelson Mullins Riley & Scarborough LLP

(57) ABSTRACT

A system is provided for imaging an underwater environment. The system includes a transducer assembly with at least one transmit transducer element and an array of receive transducer elements. Each receive transducer element is configured to receive sonar returns and form sonar return data. A sonar signal processor is configured to receive the sonar return data from each receive transducer element and generate sonar image data. The sonar return data from all of the receive transducer elements may be summed and used to form a high-definition 1D (e.g., time-based) sonar image. The sonar return data from only a subgroup may be summed and used to form a lower-definition 1D sonar image. In some systems, an array of series-connected transmit transducer elements can be used. The orientation of the emitting faces of the array may vary slightly to mimic a curved surface for increased beam coverage.

24 Claims, 13 Drawing Sheets

(52) U.S. Cl.
CPC ...... *G01S 15/8918* (2013.01); *G01S 15/8993* (2013.01); *G10K 11/008* (2013.01)

(56) References Cited

U.S. PATENT DOCUMENTS

| | | | |
|---|---|---|---|
| 5,822,276 A | 10/1998 | Miklovic | |
| 6,104,673 A * | 8/2000 | Cole | G01S 7/52017 367/11 |
| 6,285,628 B1 * | 9/2001 | Kiesel | G10K 11/343 367/138 |
| 6,741,711 B1 * | 5/2004 | Sibbald | H04S 1/007 381/310 |
| 7,046,582 B1 * | 5/2006 | Kosalos | G01S 7/52003 367/103 |
| 8,254,208 B2 | 8/2012 | Vogt | |
| 8,300,499 B2 | 10/2012 | Coleman et al. | |
| 8,470,605 B2 | 6/2013 | Putnam | |
| 9,739,884 B2 | 8/2017 | Proctor et al. | |
| 10,031,207 B2 * | 7/2018 | Wilby | G01S 7/527 |
| 10,031,216 B2 * | 7/2018 | Wilby | G01S 15/8904 |
| 10,514,451 B2 * | 12/2019 | Brown | G01S 7/6272 |
| 10,545,236 B2 * | 1/2020 | Phillips | G01S 15/89 |
| 2001/0051772 A1 | 12/2001 | Bae | |
| 2002/0126577 A1 * | 9/2002 | Borchardt | G01S 15/87 367/88 |
| 2002/0187813 A1 | 12/2002 | Guo | |
| 2003/0127609 A1 | 7/2003 | El-hage et al. | |
| 2003/0206640 A1 * | 11/2003 | Malvar | H03H 21/0012 381/93 |
| 2003/0235112 A1 * | 12/2003 | Zimmerman | G01S 15/89 367/4 |
| 2005/0007882 A1 | 1/2005 | Bachelor et al. | |
| 2005/0046584 A1 | 3/2005 | Breed | |
| 2006/0042389 A1 * | 3/2006 | Sato | A61B 8/145 73/603 |
| 2006/0063271 A1 | 3/2006 | Putnam et al. | |
| 2008/0080313 A1 | 4/2008 | Brumley et al. | |
| 2010/0067330 A1 * | 3/2010 | Collier | G01S 15/89 367/88 |
| 2010/0103775 A1 * | 4/2010 | Betts | G01S 15/107 367/88 |
| 2011/0189440 A1 | 8/2011 | Appleby et al. | |
| 2011/0208060 A1 * | 8/2011 | Haase | A61B 5/1135 600/453 |
| 2012/0106300 A1 * | 5/2012 | Maguire | G01S 7/56 367/153 |
| 2013/0208568 A1 | 8/2013 | Coleman | |
| 2013/0258811 A1 * | 10/2013 | Guigne | G01S 15/88 367/88 |
| 2014/0113828 A1 | 4/2014 | Gilbert et al. | |
| 2015/0312526 A1 | 10/2015 | Coleman et al. | |
| 2016/0341827 A1 | 11/2016 | Horner et al. | |
| 2017/0146642 A1 | 5/2017 | Stokes et al. | |
| 2017/0285167 A1 | 10/2017 | Proctor et al. | |
| 2019/0265340 A1 | 8/2019 | Antao | |
| 2020/0333787 A1 * | 10/2020 | Corbieres | G05D 1/0094 |

OTHER PUBLICATIONS

U.S. Appl. No. 15/907,733, filed Feb. 28, 2018 in the name of Barry Antao.

* cited by examiner

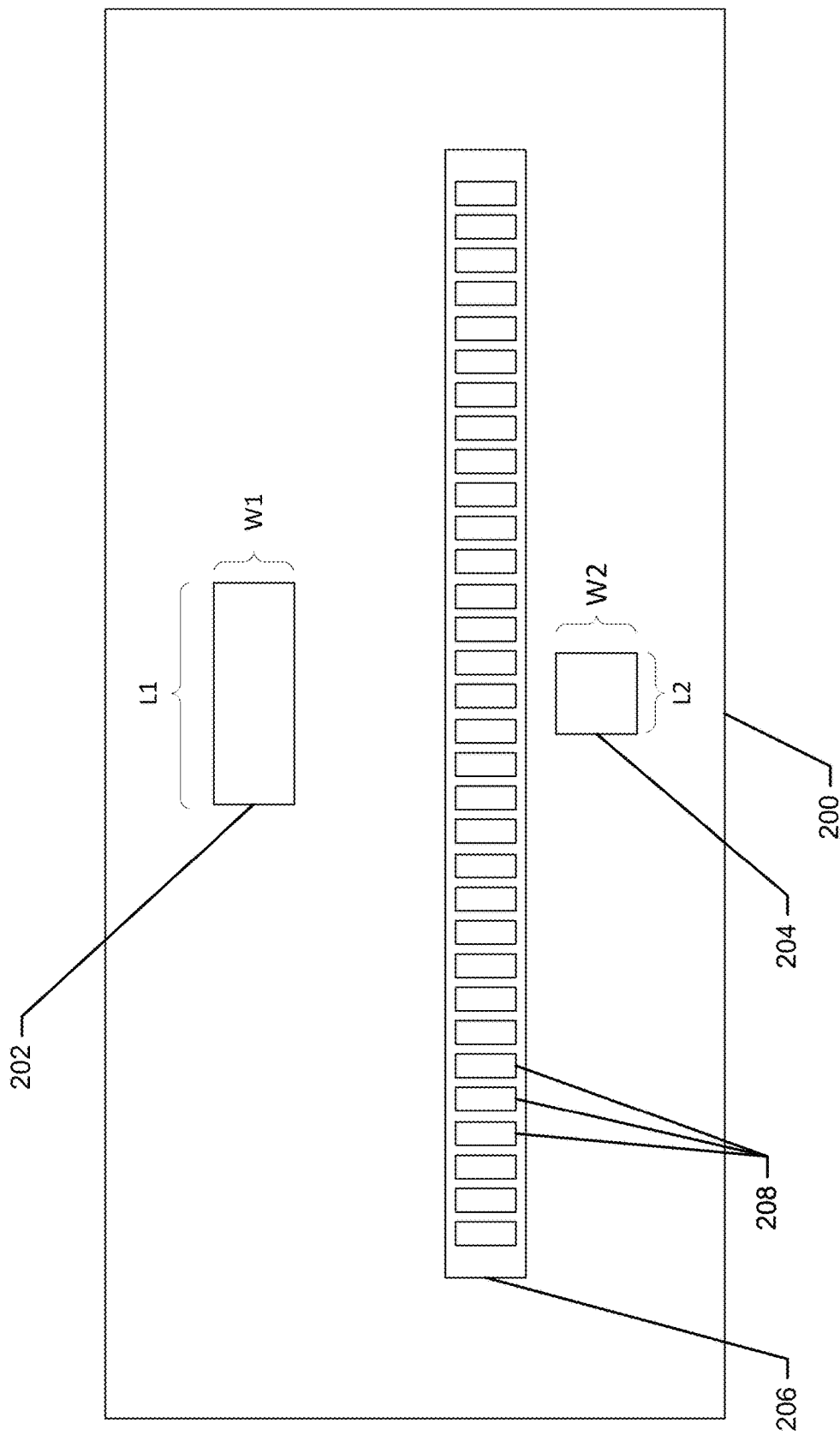

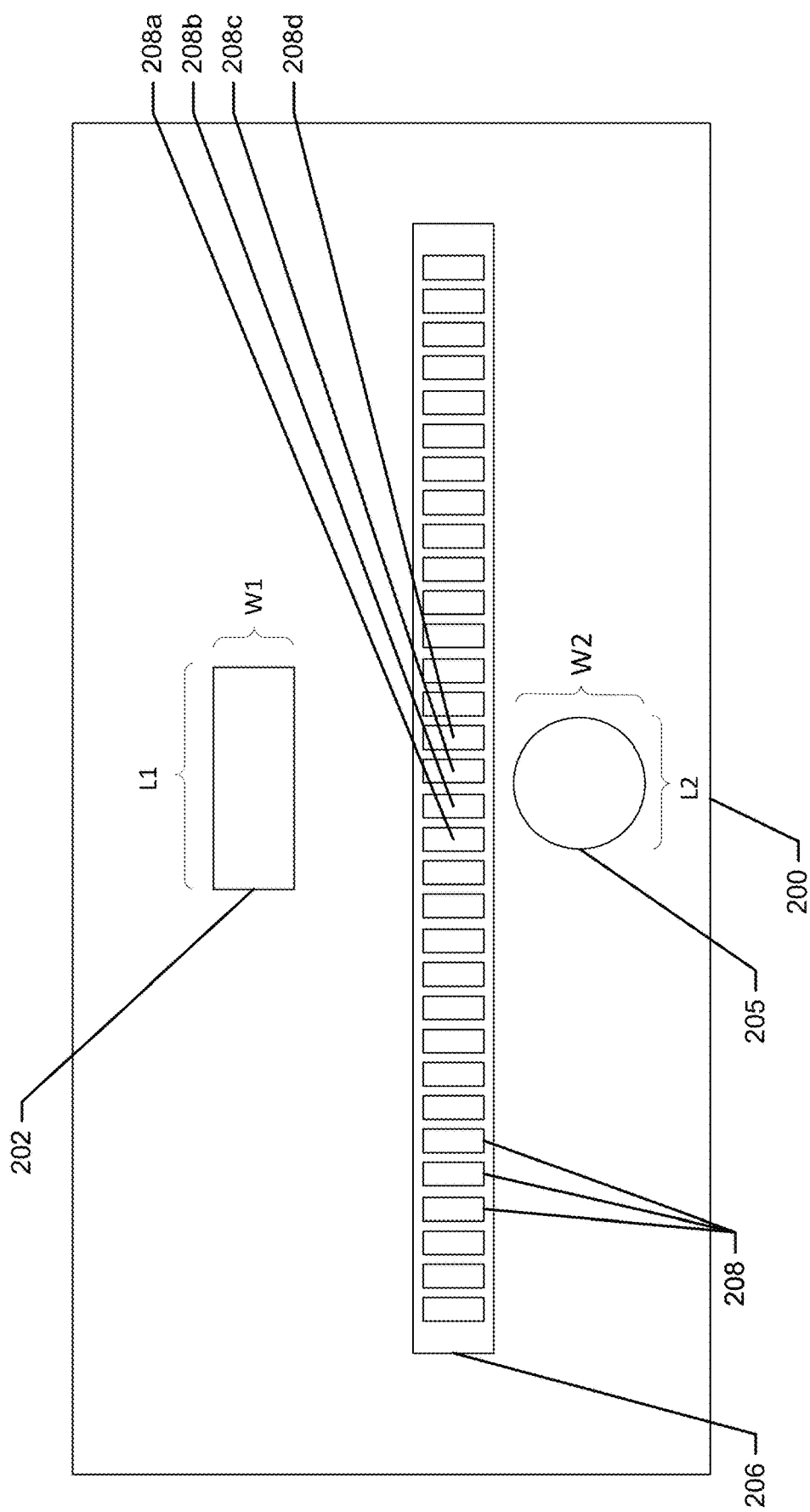

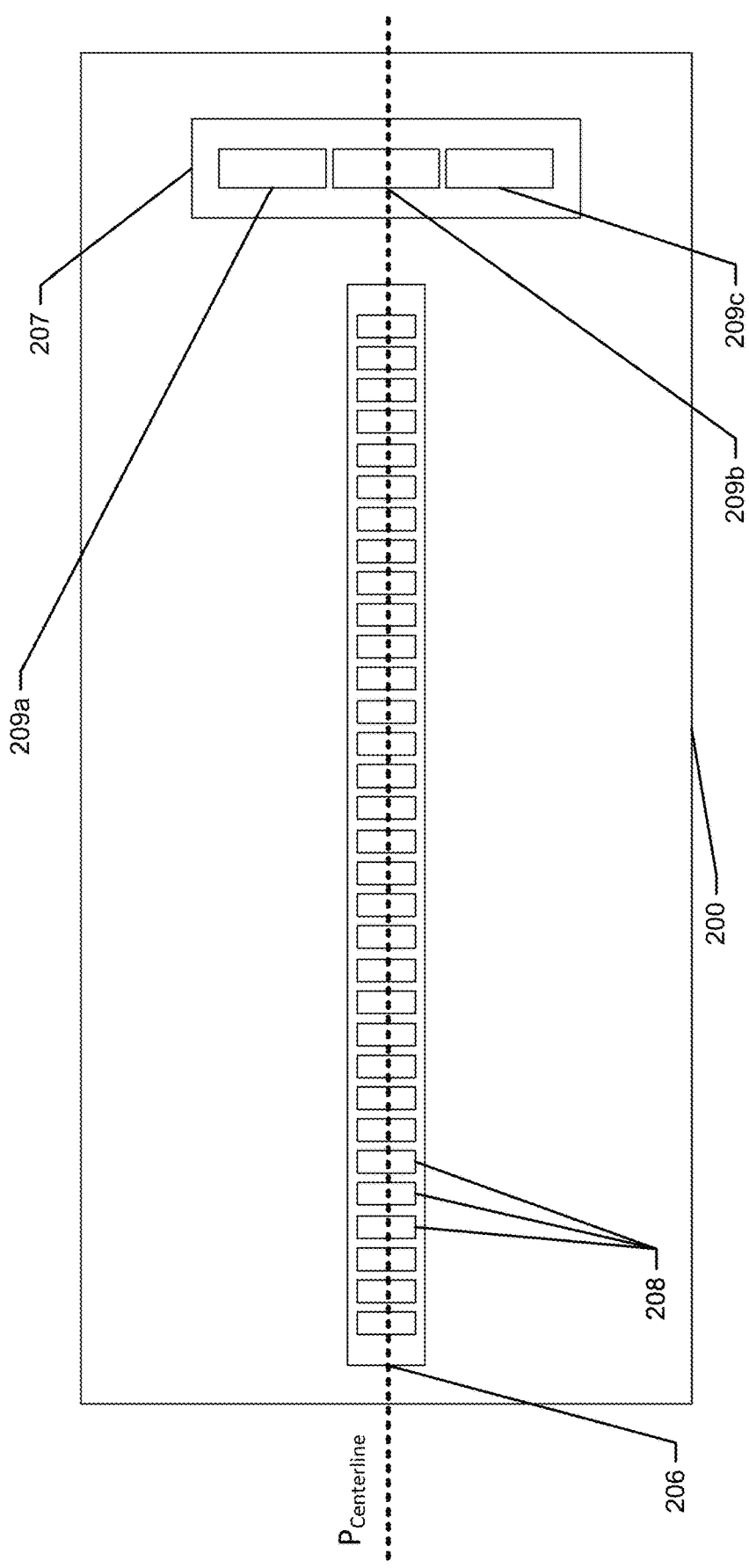

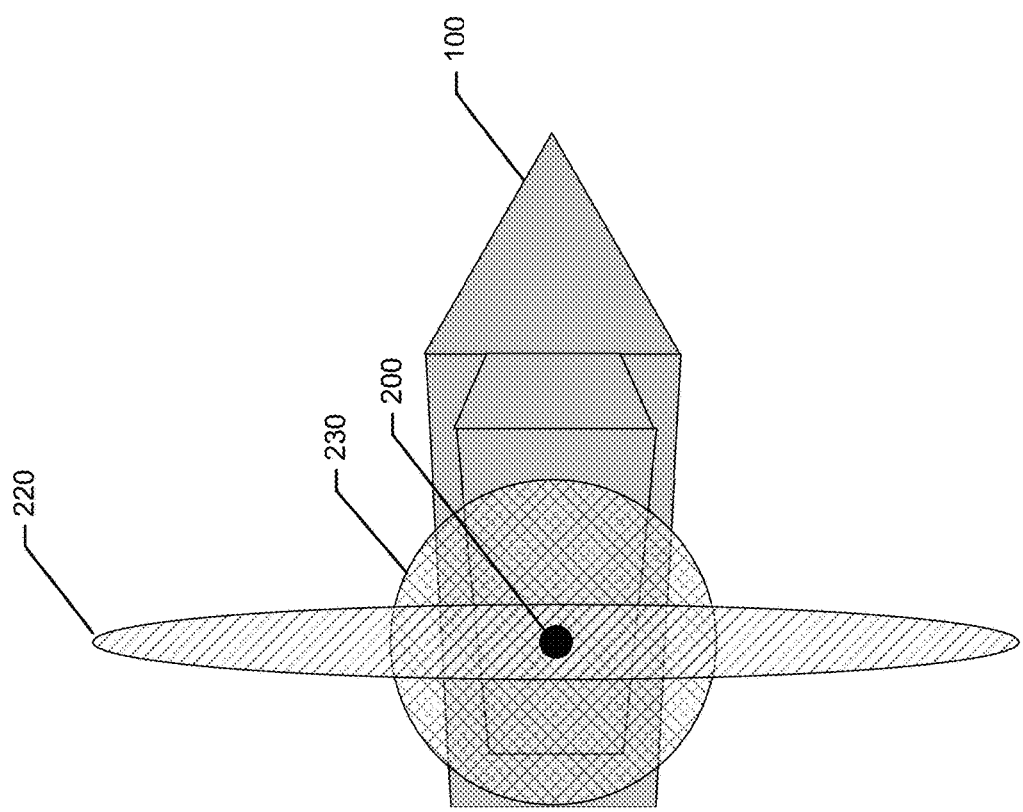

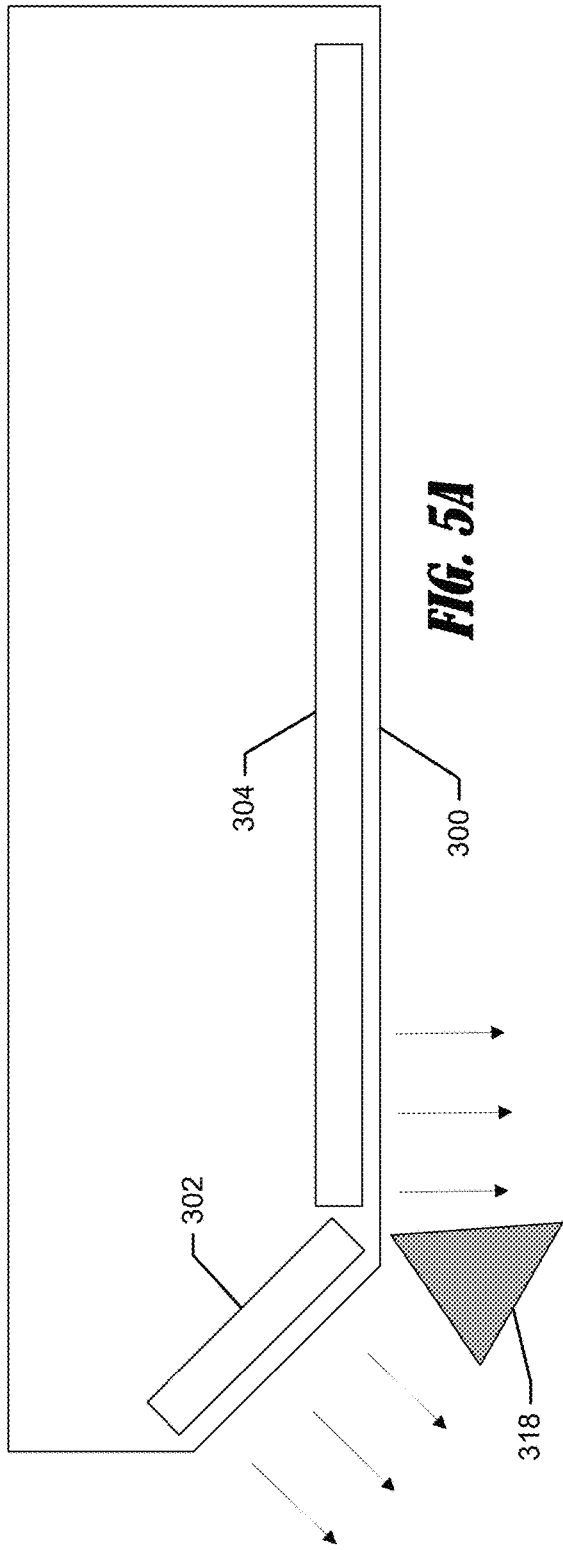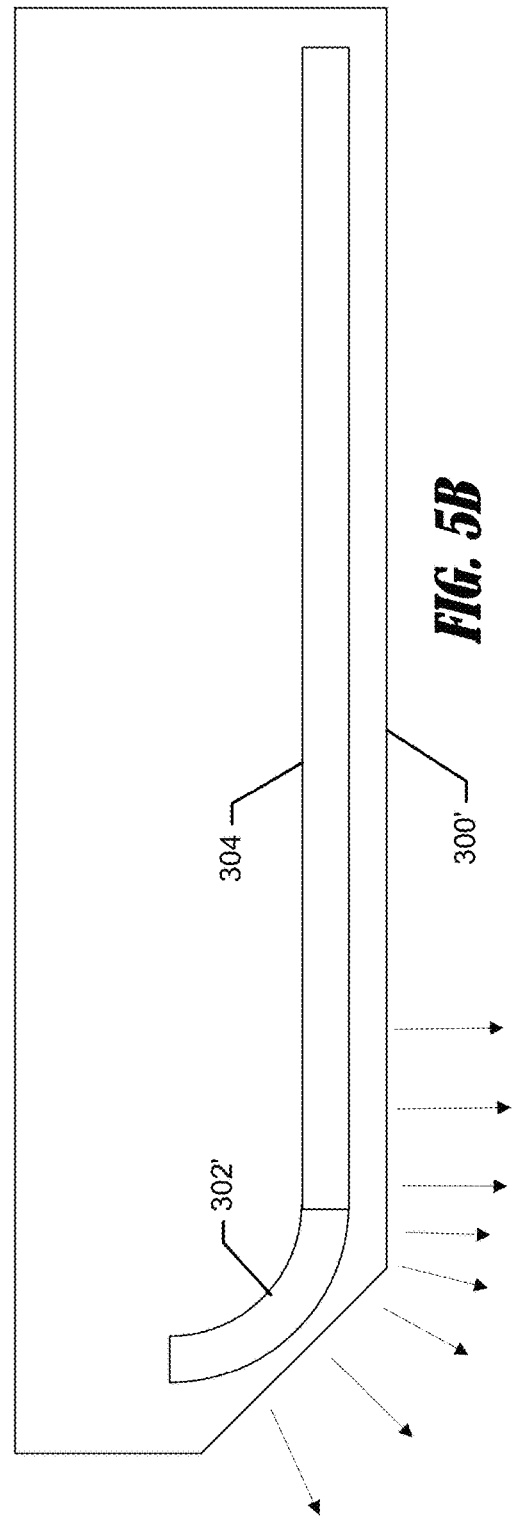

SONAR TRANSDUCER HAVING GEOMETRIC ELEMENTS

CROSS-REFERENCE TO RELATED APPLICATION(S)

This application claims priority to and is a continuation-in-part of U.S. application Ser. No. 15/907,733, entitled "Sonar Transducer Having Geometric Elements", filed Feb. 28, 2018, which is hereby incorporated by reference in its entirety.

FIELD OF THE INVENTION

Embodiments of the present invention relate generally to sonar transducer operation, and more particularly, to systems and apparatuses for sonar transducer operation utilizing geometric transducer elements.

BACKGROUND OF THE INVENTION

Sonar (SOund Navigation And Ranging) has long been used to detect waterborne or underwater objects. For example, sonar devices may be used to determine depth and bottom topography, detect fish, locate wreckage, etc. In this regard, due to the extreme limits to visibility underwater, sonar is typically the most accurate way to locate objects underwater. Sonar transducer elements, or simply transducers, convert electrical energy into sound or vibrations at a particular frequency. A sonar sound beam (e.g., one or more sonar signals) is transmitted into and through the water and is reflected from objects it encounters. The transducer receives the reflected sound (the "sonar returns") and converts the sound energy into electrical energy. Based on the known speed of sound, it is possible to determine the distance to and/or location of the waterborne or underwater objects. The sonar return signals can also be processed to be displayed on a display device, giving the user a "picture" (or image) of the underwater environment.

The shape of the emitting face of a transducer element may dictate the beam shape of the sonar signals emitted into the underwater environment. For example, an elongated emitting face may generate a fan-shaped beam pattern and a transducer element with a square or circular shaped emitting face may have a more conical beam shape. Each beam shape is associated with distinct characteristics in sonar images resulting therefrom, such as the data resolution for underwater structures, fish, or other underwater objects.

BRIEF SUMMARY OF THE INVENTION

In some sonar transducer arrangements, a single transducer element may emit one or more sonar signals into the body of water. The resulting sonar returns are then received by one or more second receiving elements and/or the transmitting element. As mentioned above, the shape of the emitting face of the transducer element may determine the shape of the sonar beam emitted therefrom. In applications using an elongated (e.g., linear, elongated rectangle, or the like) transducer element produces a fan-shaped beam, the resulting sonar images may have high structural detail, but relatively low detail for moving objects including fish, bait, or the like. As the length of the emitting face with respect to the width becomes closer to a 1:1 ratio, the shape of the sonar beam shifts from being fan-shaped to a more cone-shape, resulting in reduced structural detail, but an increase in fish detail (e.g., producing desirable "fish arches"). As such, using a single transmitting crystal can limit the resulting image in desirability, such as by producing high structural detail with low fish detail, mediocre structural and fish detail, or high fish detail and low structural detail.

In an example embodiment, a sonar transducer is provided that includes two transmitting transducer elements and one receiving transducer element. The first transmitting transducer element is configured to provide high structural detail, while the second transmitting transducer element is configured to provide high fish detail. Particularly, the length-to-width ratio of the emitting face of the first transducer element is larger than the length-to-width ratio of the emitting face of the second transducer element. In some embodiments, to accommodate receiving sonar returns from both transmitting transducer elements, the transmitting transducer elements may emit at alternating times, different frequencies, or the like.

Since sonar returns are received with both high detail structural data and high detail fish data, sonar images may be generated with either the high detail structure data or the high detail fish data, which may be toggled as needed, shown together (such as in split screen), or blended to generate a new sonar image including both the high detail structural data and high detail fish data. In some embodiments, the blend ratio may be set at a predetermined optimal blend ratio. However, in some embodiments, the blend ratio may be dynamically adjusted by the user to render the desired level of detail based on application or user preference.

Sonar transducers are typically configured to be directional based, such as sidescan, forwardscan, downscan, or the like. As such, sonar transducers are generally housed in assemblies configured for the particular scan direction and mounting type. In this regard, in some embodiments, a transducer assembly may be provided with multi-directional scanning portions, such as including both forwardscan and downscan sonar transducer arrangements. By providing both forwardscan and downscan transducer arrangements in a common transducer assembly, the user may shift between forwardscan and downscan as desired, based on movement of a watercraft, operation of the trolling motor or engine, or the like. Additionally or alternatively, the sonar image data associated with the forwardscan may be merged with the downscan to provide a combined or continuous sonar image. In an example embodiment, the forwardscan portion may be curved to limit blind spots in the sonar image between the forwardscan portion of the sonar image and the downscan portion of the sonar image.

In some embodiments, an array of receive transducer elements may be used to form traditional sonar images, such as one-dimensional (1D) (e.g., time-based) sonar images. For example, a sonar signal processor may be configured to sum the sonar return data received from one or more individual receive transducer elements of the receive array. In this regard, depending on which receive transducer elements are utilized, different levels of definition of the resulting sonar image can be obtained. For example, in the situation where the array includes a large ratio of length to width (e.g., 5:1), then summing the sonar return data from all or most of the individual receive transducer elements results in a 1D sonar image with relatively high-definition (e.g., which may be equivalent to a sonar image formed using a linear (e.g., rectangular-shaped) transducer element). Along similar lines, summing the sonar return data from a small subgroup of individual receive transducer elements (e.g., 1-4 elements) results in a 1D sonar image with relatively lower definition (e.g., which may be equivalent to a sonar image formed using a conical (e.g., circular-shaped) transducer element). Variations of summed sonar return data and relative positioning of the selected receive transducer elements to product different sonar images are, thus, contemplated.

In some embodiments, an array of series-connected transmit transducer elements can be used to form sonar signal within the water. In this regard, the "effective" emitting face of an array of transducer elements electrically connected in series can determine the resulting beam shape—thereby enabling different types of beam coverage depending on the shapes of the transducer elements and mounting configurations. For example, the orientation of the emitting faces of each element in the array may slightly vary to mimic a curved surface, which may provide for increased beam coverage. In this regard, in some embodiments, the effective curved surface for the emitting face of the array may cause a widened beam coverage in the corresponding direction of the resultant beam—which may be desirable.

In an example embodiment, a system for imaging an underwater environment of a body of water is provided. The system comprises a transducer assembly comprising at least one transmit transducer element configured to transmit sonar signals into the underwater environment. The transducer assembly further comprises an array of a plurality of receive transducer elements. The array of the plurality of receive transducer elements defines a length and a width with a ratio of the length to the width being at least 3:1. Each of the plurality of receive transducer elements is configured to receive sonar returns from the sonar signals and form corresponding sonar return data. The system further includes a sonar signal processor configured to receive the sonar return data from each of the plurality of receive transducer elements of the array; sum the sonar return data from all of the plurality of receive transducer elements to form summed sonar return data; and generate sonar image data based on the summed sonar return data, wherein the sonar image data forms a sonar image representing the underwater environment. The system further includes a marine electronic device comprising a user interface comprising a display, a marine electronic device processor, and a memory including computer program code. The computer program code is configured to, with the marine electronic device processor, cause the marine electronic device to receive the sonar image data from the sonar signal processor; and cause presentation of the sonar image, based on the sonar image data.

In some embodiments, the transducer assembly is configured to be mounted to a watercraft such that the array of receive transducer elements is oriented downwardly. The sonar image forms a downward sonar image representing a one-dimensional image of the underwater environment beneath the watercraft.

In some embodiments, the array of the plurality of receive transducer elements comprises at least 8 receive transducer elements. In some embodiments, the sonar signal processor is further configured to sum the sonar return data from a subgroup of the plurality of receive transducer elements to form second summed sonar return data. The subgroup of the plurality of receive transducer elements is less than all of the plurality of receive transducer elements. The sonar signal processor is further configured to generate second sonar image data based on the second summed sonar return data. The second sonar image data forms a second sonar image representing the underwater environment.

In some embodiments, the subgroup of the plurality of receive transducer elements includes at least two receive transducer elements that are located generally in the center of the array of receive transducer elements.

In some embodiments, the computer program code is further configured to, with the marine electronic device processor, cause the marine electronic device to enable selection by a user of at least the sonar image and the second sonar image; cause, in response to receiving a selection of the sonar image, presentation of the sonar image, based on the sonar image data; and cause, in response to receiving a selection of the second sonar image, presentation of the second sonar image, based on the second sonar image data.

In some embodiments, the transducer assembly is configured to be mounted to a watercraft such that the array of receive transducer elements is oriented downwardly. The sonar image forms a downward sonar image representing a one-dimensional image of the underwater environment beneath the watercraft. The second sonar image forms a second downward sonar image representing a one-dimensional image of the underwater environment beneath the watercraft. The definition of objects within the sonar image is greater than the definition of objects within the second sonar image.

In some embodiments, the sonar signal processor comprises a multiplexer such that sonar return data from each of the plurality of receive transducer elements can be selected individually for summation.

In some embodiments, the sonar signal processor is further configured to process the sonar return data from each of the plurality of receive transducer elements to form two-dimensional (2D) or three-dimensional (3D) sonar return data; and generate 2D or 3D sonar image data based on the 2D or 3D sonar return data, wherein the 2D or 3D sonar image data forms a 2D or 3D sonar image representing the underwater environment. In some embodiments, the computer program code is further configured to, with the marine electronic device processor, cause the marine electronic device to enable selection by a user of at least the sonar image and the 2D or 3D sonar image; cause, in response to receiving a selection of the sonar image, presentation of the sonar image, based on the sonar image data; and cause, in response to receiving a selection of the 2D or 3D sonar image, presentation of the 2D or 3D sonar image, based on the 2D or 3D sonar image data.

In some embodiments, the at least one transmit transducer comprises one of a rectangular transducer element, a conical transducer element, a square transducer element, or an array of transducer elements.

In some embodiments, the at least one transmit transducer comprises an array of a plurality of transmit transducer elements electrically connected in series. Each of the plurality of transmit transducer elements comprises an emitting face. At least two of the plurality of transmit transducer elements are mounted with respect to each other such that a respective emitting face of the at least two of the plurality of transmit transducer elements is oriented in a different direction.

In another example embodiment, a transducer assembly is provided. The transducer assembly comprises at least one transmit transducer element configured to transmit sonar signals into an underwater environment. The transducer assembly comprises an array of a plurality of receive transducer elements. The array of the plurality of receive transducer elements defines a length and a width with a ratio of the length to the width being at least 3:1. Each of the plurality of receive transducer elements is configured to receive sonar returns from the sonar signals and form corresponding sonar return data. The transducer assembly further comprises a sonar signal processor configured to: receive the sonar return data from each of the plurality of receive transducer elements of the array; sum the sonar return data from all of the plurality of receive transducer elements to faun summed sonar return data; and generate sonar image data based on the summed sonar return data, wherein the sonar image data forms a sonar image representing the underwater environment.

In some embodiments, the array of the plurality of receive transducer elements comprises at least 8 receive transducer elements. In some embodiments, the sonar signal processor is further configured to sum the sonar return data from a subgroup of the plurality of receive transducer elements to form second summed sonar return data, wherein the subgroup of the plurality of receive transducer elements is less than all of the plurality of receive transducer elements. The sonar signal processor is further configured to generate second sonar image data based on the second summed sonar return data, wherein the second sonar image data forms a second sonar image representing the underwater environment. In some embodiments, the subgroup of the plurality of receive transducer elements includes at least two receive transducer elements that are located generally in the center of the array of receive transducer elements.

In yet another example embodiment, a system for imaging an underwater environment is provided. The system comprises a transducer assembly comprising at least one transmit transducer element configured to transmit sonar signals into the underwater environment. The system further includes an array of a plurality of receive transducer elements, wherein the array of the plurality of receive transducer elements defines a length and a width with a ratio of the length to the width being at least 3:1. Each of the plurality of receive transducer elements is configured to receive sonar returns from the sonar signals and form corresponding sonar return data. The system further includes a sonar signal processor configured to receive the sonar return data from each of the plurality of receive transducer elements of the array; sum the sonar return data from a subgroup of the plurality of receive transducer elements to faun summed sonar return data, wherein the subgroup of the plurality of receive transducer elements is less than all of the plurality of receive transducer elements; and generate sonar image data based on the summed sonar return data, wherein the sonar image data forms a sonar image representing the underwater environment. The system further includes a marine electronic device comprising a user interface comprising a display, a marine electronic device processor, and a memory including computer program code. The computer program code is configured to, with the marine electronic device processor, cause the marine electronic device to receive the sonar image data from the sonar signal processor; and cause presentation of the sonar image, based on the sonar image data.

In some embodiments, the array of the plurality of receive transducer elements comprises at least 8 receive transducer elements, wherein the subgroup of the plurality of receive transducer elements comprises at least two receive transducer elements.

In some embodiments, the subgroup of the plurality of receive transducer elements includes at least two receive transducer elements that are located generally in the center of the array of receive transducer elements.

In some embodiments, the sonar signal processor is further configured to sum the sonar return data from all of the plurality of receive transducer elements to form second summed sonar return data; and generate second sonar image data based on the second summed sonar return data, wherein the second sonar image data forms a second sonar image representing the underwater environment. In some embodiments, the computer program code is further configured to, with the marine electronic device processor, cause the marine electronic device to enable selection by a user of at least the sonar image and the second sonar image; cause, in response to receiving a selection of the sonar image, presentation of the sonar image, based on the sonar image data; and cause, in response to receiving a selection of the second sonar image, presentation of the second sonar image, based on the second sonar image data.

In some embodiments, the sonar signal processor is further configured to process the sonar return data from each of the plurality of receive transducer elements to form two-dimensional (2D) or three-dimensional (3D) sonar return data; and generate 2D or 3D sonar image data based on the 2D or 3D sonar return data, wherein the 2D or 3D sonar image data forms a 2D or 3D sonar image representing the underwater environment. In some embodiments, the computer program code is further configured to, with the marine electronic device processor, cause the marine electronic device to enable selection by a user of at least the sonar image and the 2D or 3D sonar image; cause, in response to receiving a selection of the sonar image, presentation of the sonar image, based on the sonar image data; and cause, in response to receiving a selection of the 2D or 3D sonar image, presentation of the 2D or 3D sonar image, based on the 2D or 3D sonar image data.

In some embodiments, the sonar signal processor comprises a multiplexer such that sonar return data from each of the plurality of receive transducer elements can be selected individually for summation.

In some embodiments, the transducer assembly is configured to be mounted to a watercraft such that the array of receive transducer elements is oriented downwardly, and wherein the sonar image forms a downward sonar image representing a one-dimensional image of the underwater environment beneath the watercraft.

In yet another example embodiment, a transducer assembly is provided. The transducer assembly includes at least one transmit transducer element configured to transmit sonar signals into the underwater environment and an array of a plurality of receive transducer elements. The array of the plurality of receive transducer elements defines a length and a width with a ratio of the length to the width being at least 3:1. Each of the plurality of receive transducer elements is configured to receive sonar returns from the sonar signals and form corresponding sonar return data. The transducer assembly further includes a sonar signal processor configured to receive the sonar return data from each of the plurality of receive transducer elements of the array; sum the sonar return data from a subgroup of the plurality of receive transducer elements to form summed sonar return data, wherein the subgroup of the plurality of receive transducer elements is less than all of the plurality of receive transducer elements; and generate sonar image data based on the summed sonar return data, wherein the sonar image data forms a sonar image representing the underwater environment.

In yet another example embodiment, a system for imaging an underwater environment of a body of water is provided. The system comprises a transducer assembly comprising an array of a plurality of transmit transducer elements, wherein the plurality of transmit transducer elements are electrically connected in series and configured to transmit sonar signals into the underwater environment. Each of the plurality of transmit transducer elements comprises an emitting face. At least two of the plurality of transmit transducer elements are mounted with respect to each other such that a respective emitting face of the at least two of the plurality of transmit transducer elements is oriented in a different direction. The transducer assembly further includes an array of a plurality of receive transducer elements, wherein each of the plurality of receive transducer elements is configured to receive sonar returns from the sonar signals and form corresponding sonar return data. The system further includes a sonar signal processor configured to receive the sonar return data from each of the plurality of receive transducer elements of the array; and generate sonar image data based on the sonar return data, wherein the sonar image data forms a sonar image representing the underwater environment. The system further includes a marine electronic device comprising a user interface comprising a display, a marine electronic device processor, and a memory including computer program code. The computer program code is configured to, with the marine electronic device processor, cause the marine electronic device to receive the sonar image data from the sonar signal processor; and cause presentation of the sonar image, based on the sonar image data.

In some embodiments, each of the plurality of transmit transducer elements defines a length and a width and the length is greater than the width, and each of the plurality of transmit transducer elements are mounted such that the lengths of each of the plurality of transmit transducer elements are arranged in a curved line.

In some embodiments, each of the plurality of transmit transducer elements are mounted such that the emitting faces of the plurality of transmit transducer elements mimic a convex curved surface with respect to the underwater environment. In some embodiments, the plurality of transmit transducer elements comprises at least a center transmit transducer element, a left transmit transducer element, and right transmit transducer element. The center transmit transducer element is mounted in the center of the array of the plurality of transmit transducer elements with an emitting face that is oriented generally at a first angle with respect to a mounting plane of the transducer assembly. The left transmit transducer element is mounted off to a left side of the center transmit transducer element with an emitting face that is oriented at a second angle with respect to the mounting plane. The right transmit transducer element is mounted off to a right side of the center transmit transducer element with an emitting face that is oriented at a third angle with respect to the mounting plane. The second angle and the third angle are each less than the first angle.

In some embodiments, a difference between the second angle and the first angle is between 5 degrees and 20 degrees, and a difference between the third angle and the first angle is between 5 degrees and 20 degrees.

In some embodiments, a difference between the second angle and the first angle is approximately 15 degrees, and a difference between the third angle and the first angle is approximately 15 degrees.

In some embodiments, the array of the plurality of transmit transducer elements is configured to emit sonar signals in an approximately 50 degree by 50 degree beam.

In some embodiments, the sonar signal processor is further configured to process the sonar return data from each of the plurality of receive transducer elements to form two-dimensional (2D) or three-dimensional (3D) sonar return data; and generate 2D or 3D sonar image data based on the 2D or 3D sonar return data, wherein the 2D or 3D sonar image data forms a 2D or 3D sonar image representing the underwater environment.

In some embodiments, the sonar signal processor comprises a multiplexer such that sonar return data from each of the plurality of receive transducer elements can be selected individually.

In some embodiments, the sonar signal processor is further configured to sum the sonar return data from all of the plurality of receive transducer elements to form summed sonar return data; and generate second sonar image data based on the summed sonar return data, wherein the second sonar image data forms a second sonar image representing the underwater environment.

In some embodiments, the sonar signal processor is further configured to sum the sonar return data from a subgroup of the plurality of receive transducer elements to form summed sonar return data, wherein the subgroup of the plurality of receive transducer elements is less than all of the plurality of receive transducer elements; and generate second sonar image data based on the summed sonar return data, wherein the second sonar image data forms a second sonar image representing the underwater environment.

In yet another example embodiment, a transducer assembly for imaging an underwater environment of a body of water is provided. The transducer assembly comprises an array of a plurality of transmit transducer elements. The plurality of transmit transducer elements are electrically connected in series and configured to transmit sonar signals into the underwater environment. Each of the plurality of transmit transducer elements comprises an emitting face. At least two of the plurality of transmit transducer elements are mounted with respect to each other such that a respective emitting face of the at least two of the plurality of transmit transducer elements is oriented in a different direction. The transducer assembly further includes an array of a plurality of receive transducer elements, wherein each of the plurality of receive transducer elements is configured to receive sonar returns from the sonar signals and form corresponding sonar return data. The transducer assembly further includes a sonar signal processor configured to receive the sonar return data from each of the plurality of receive transducer elements of the array; and generate sonar image data based on the sonar return data, wherein the sonar image data foul's a sonar image representing the underwater environment.

In some embodiments, each of the plurality of transmit transducer elements defines a length and a width and the length is greater than the width, and each of the plurality of transmit transducer elements are mounted such that the lengths of each of the plurality of transmit transducer elements are arranged in a line.

In some embodiments, each of the plurality of transmit transducer elements are mounted such that the emitting faces of the plurality of transmit transducer elements mimic a convex curved surface with respect to the underwater environment.

In some embodiments, the plurality of transmit transducer elements comprises at least a center transmit transducer element, a left transmit transducer element, and right transmit transducer element. The center transmit transducer element is mounted in the center of the array of the plurality of transmit transducer elements with an emitting face that is oriented generally at a first angle with respect to a mounting plane of the transducer assembly. The left transmit transducer element is mounted off to a left side of the center transmit transducer element with an emitting face that is oriented at a second angle with respect to the mounting plane. The right transmit transducer element is mounted off to a right side of the center transmit transducer element with an emitting face that is oriented at a third angle with respect to the mounting plane. The second angle and the third angle are each less than the first angle.

In some embodiments, a difference between the second angle and the first angle is between 5 degrees and 20 degrees, and a difference between the third angle and the first angle is between 5 degrees and 20 degrees.

In some embodiments, a difference between the second angle and the first angle is approximately 15 degrees, and a difference between the third angle and the first angle is approximately 15 degrees.

In some embodiments, the array of the plurality of transmit transducer elements is configured to emit sonar signals in an approximately 50 degree by 50 degree beam.

In some embodiments, the sonar signal processor comprises a multiplexer such that sonar return data from each of the plurality of receive transducer elements can be selected individually.

In yet another example embodiment a method of operating a transducer assembly for imaging an underwater environment of a body of water is provided. The method comprises causing an array of a plurality of transmit transducer elements to transmit sonar signals into the underwater environment, wherein the plurality of transmit transducer elements are electrically connected in series. Each of the plurality of transmit transducer elements comprises an emitting face. At least two of the plurality of transmit transducer elements are mounted with respect to each other such that a respective emitting face of the at least two of the plurality of transmit transducer elements is oriented in a different direction. The method further includes receiving, via a sonar signal process, sonar return data from each of a plurality of receive transducer elements of an array of the plurality of transmit transducer elements, wherein each of the plurality of receive transducer elements is configured to receive sonar returns from the sonar signals and form the sonar return data therefrom. The method further includes generating, via the sonar signal process, sonar image data based on the sonar return data, wherein the sonar image data font's a sonar image representing the underwater environment.

BRIEF DESCRIPTION OF THE DRAWINGS

Figure 1:
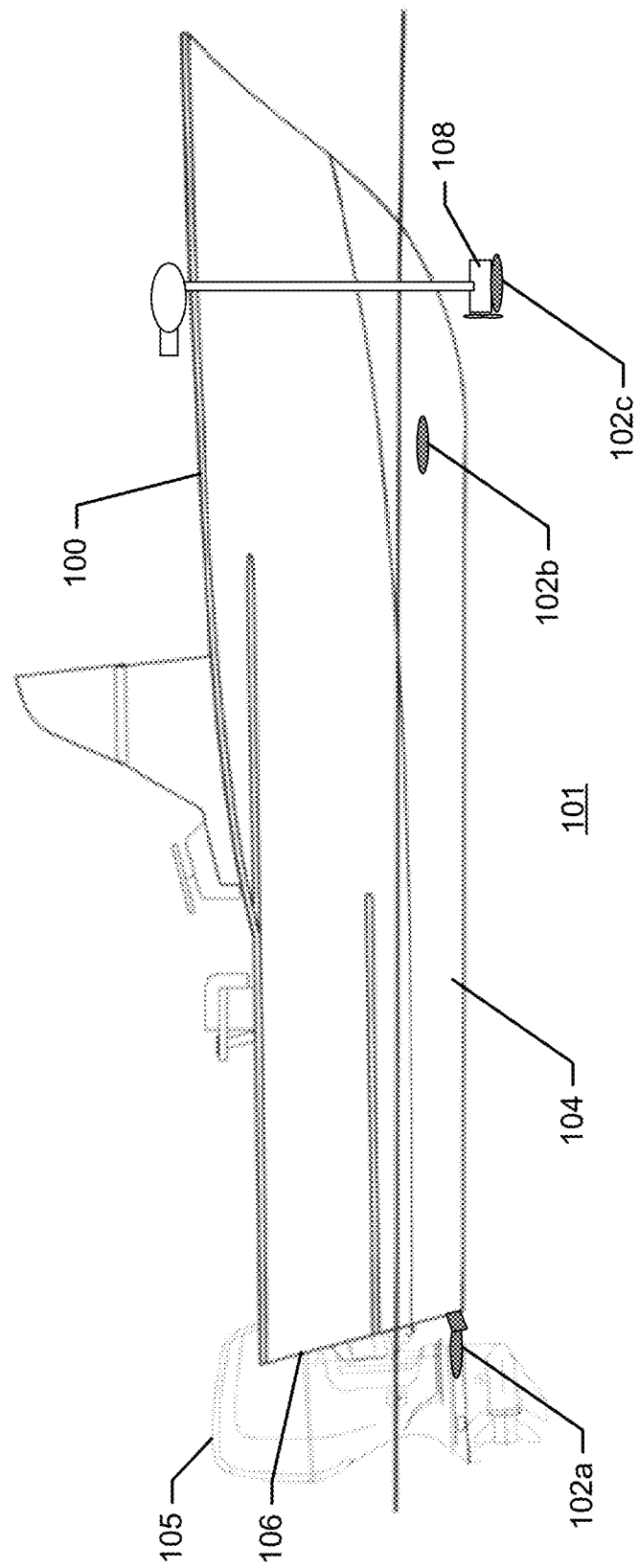
Figure 2D:
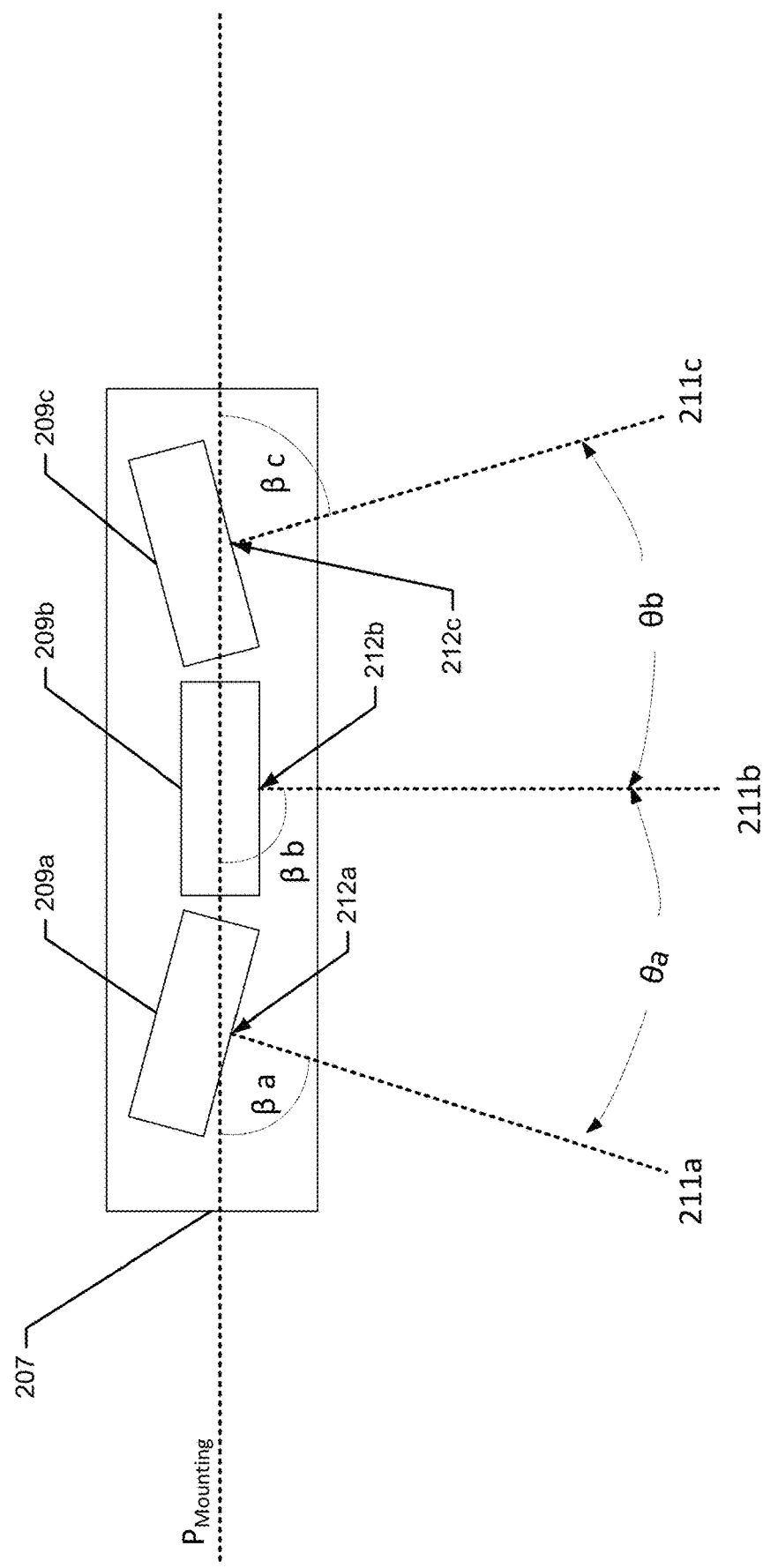
Figure 3B:
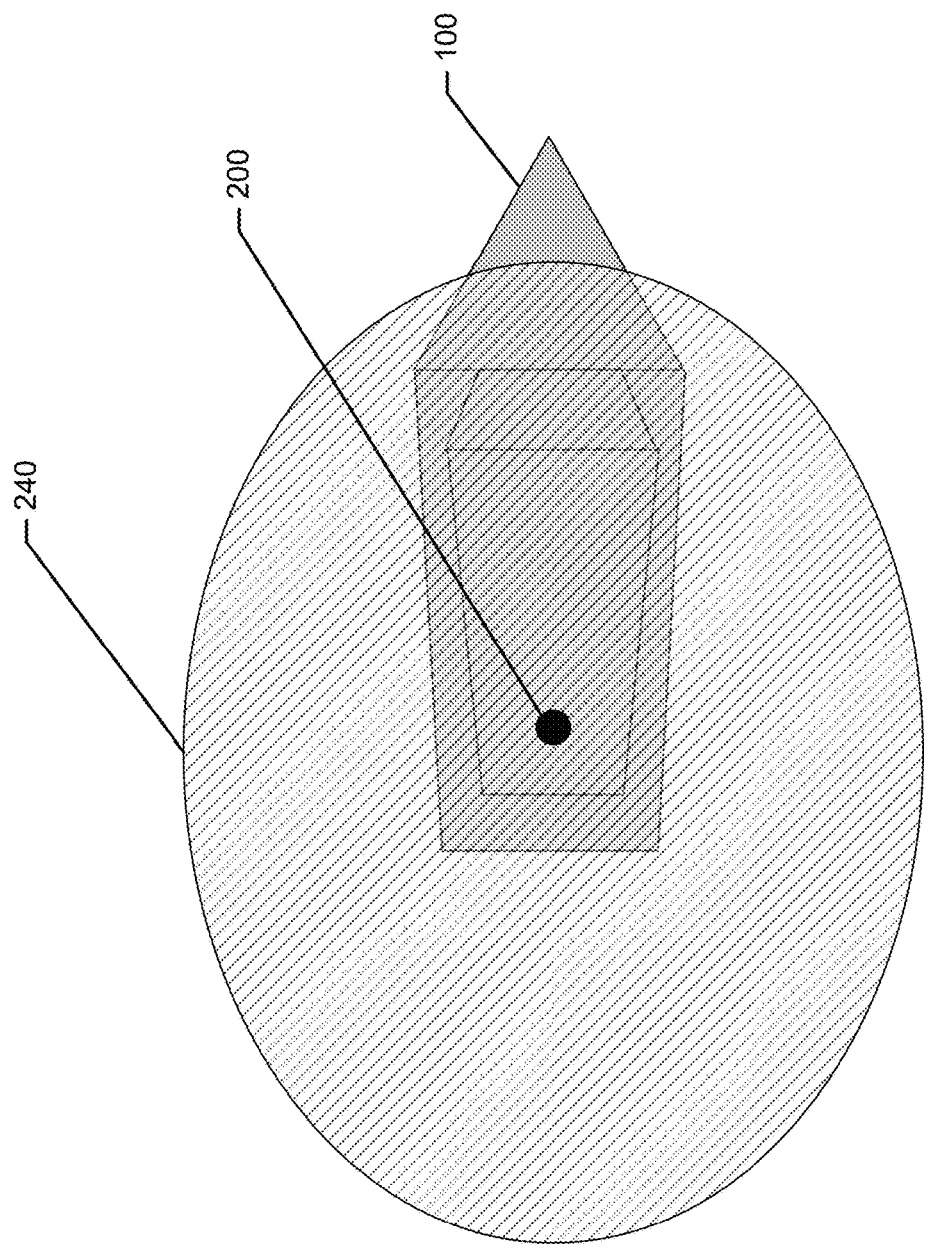
Figure 3C:
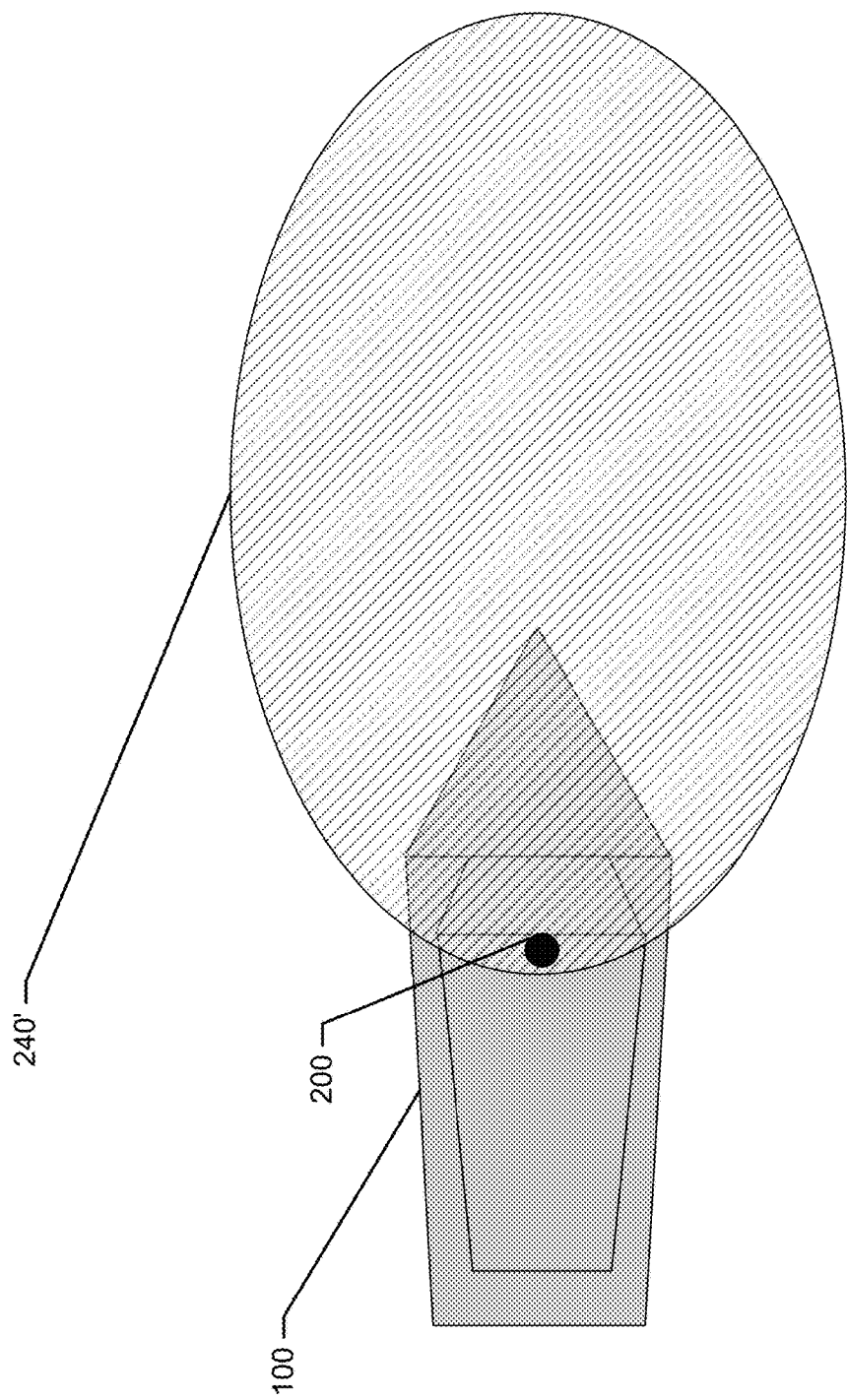
Figure 4:
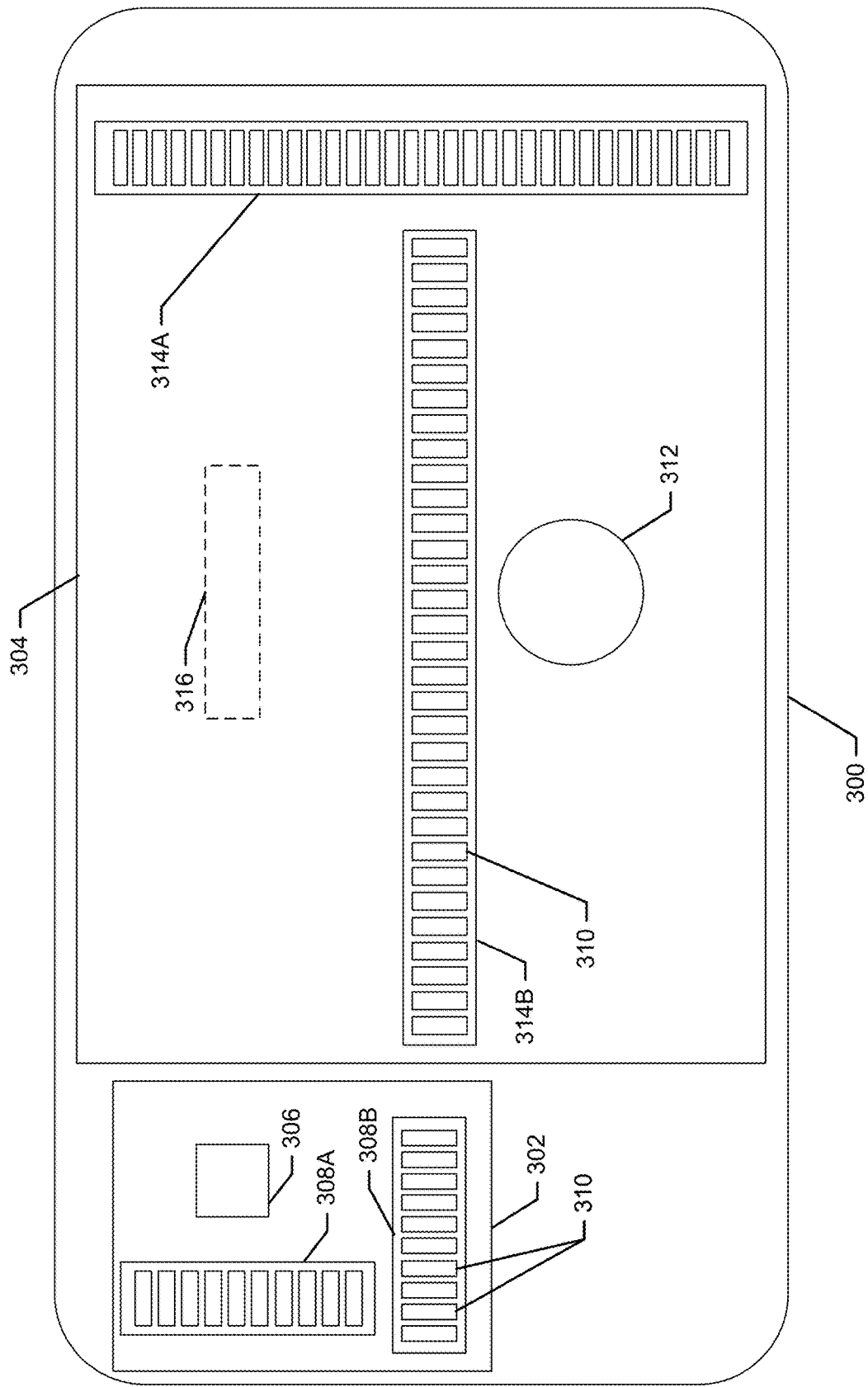
Figure 6:
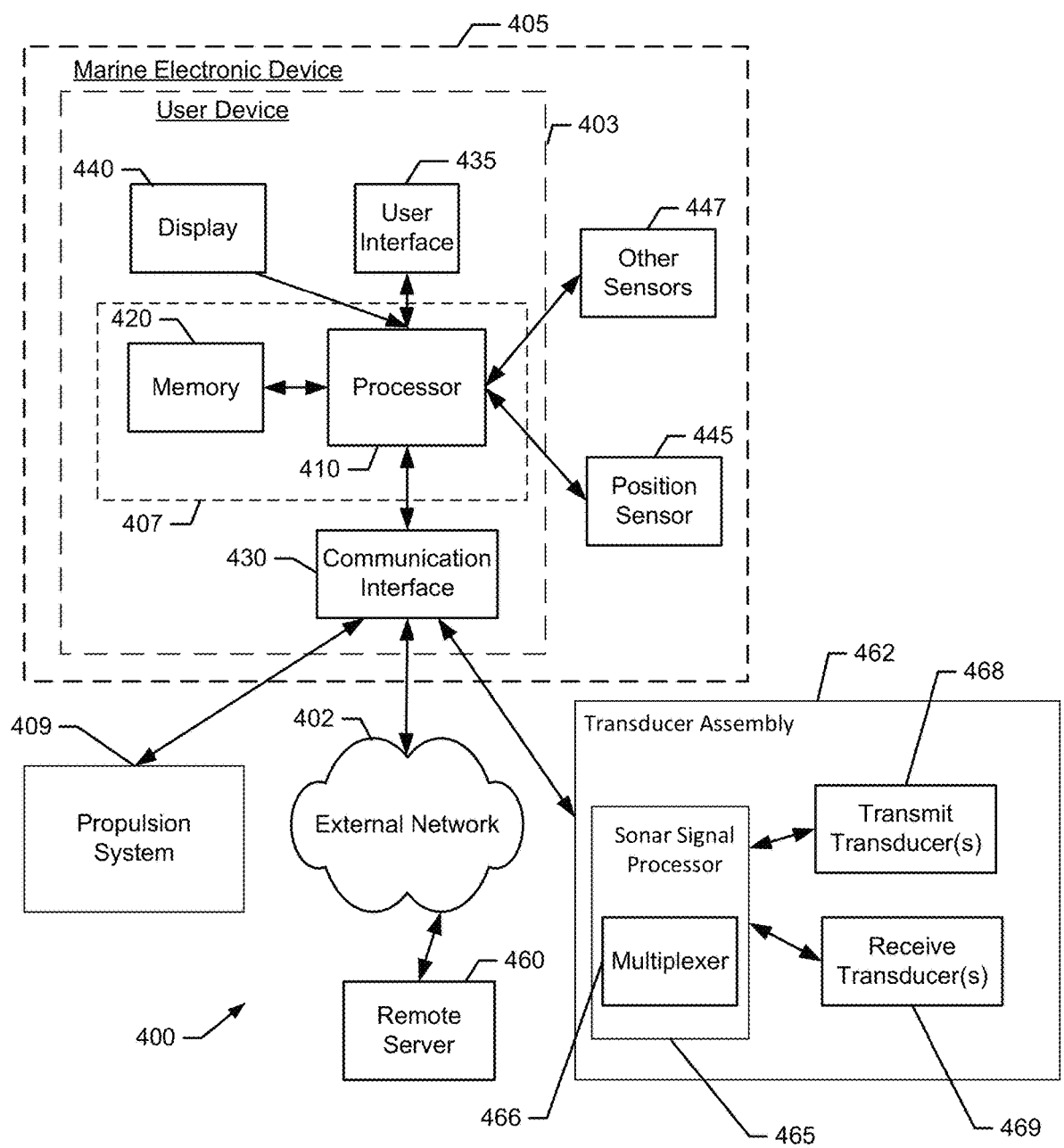
Figure 7:
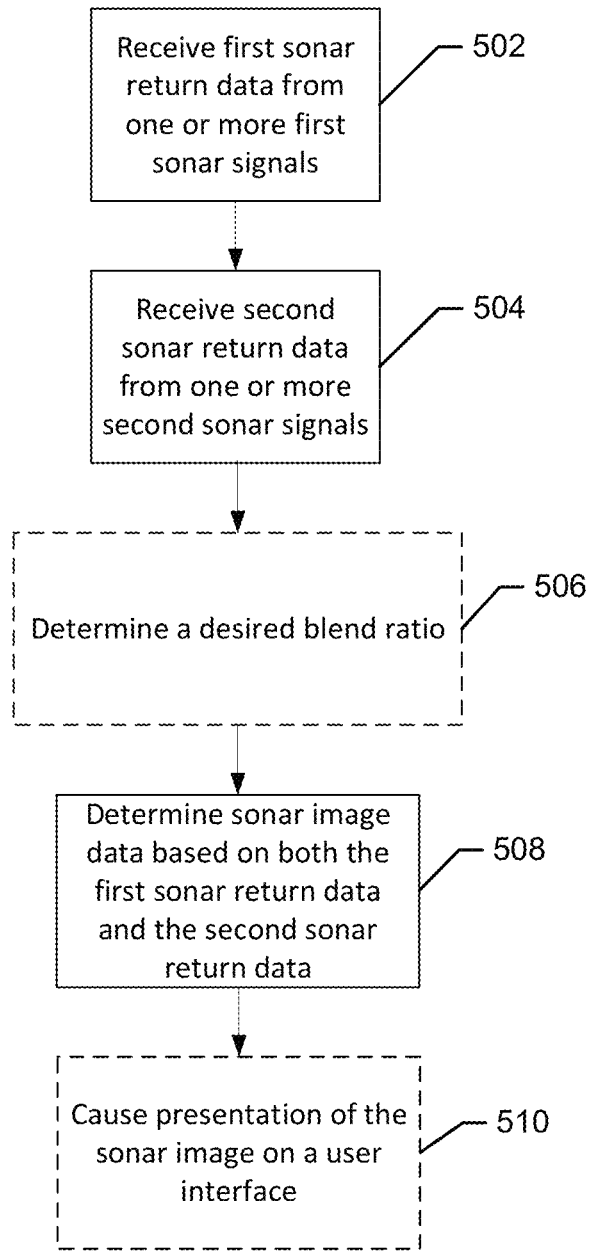
Figure 8:
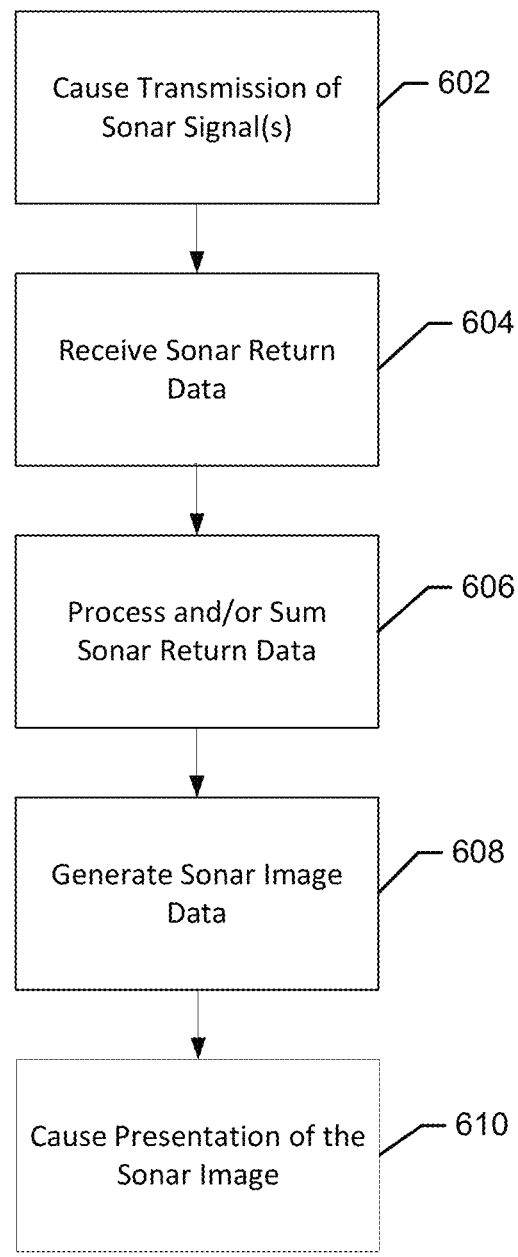

Having thus described the invention in general terms, reference will now be made to the accompanying drawings, which are not necessarily drawn to scale, and wherein:

FIG. 1 illustrates an example vessel including various sonar transducer assemblies, in accordance with some embodiments discussed herein;

FIGS. 2A and 2B illustrate example sonar transducer assemblies with poly-geometric transducer elements, in accordance with some embodiments discussed herein;

FIG. 2C illustrates another example transducer assembly that includes an array of transmit transducer elements, in accordance with some embodiments discussed herein;

FIG. 2D illustrates a cross-sectional view of an example array of transmit transducer elements, in accordance with some embodiments discussed herein;

FIG. 3A illustrates example sonar beam shapes, in accordance with some embodiments discussed herein;

FIG. 3B illustrates an example sonar beam shape produced from an example array of transmit transducer elements, wherein the array is oriented generally downwardly from the watercraft, in accordance with some embodiments discussed herein;

FIG. 3C illustrates an example sonar beam shape produced from an example array of transmit transducer elements, wherein the array is oriented in a generally forward direction with respect to the watercraft, in accordance with some embodiments discussed herein;

FIG. 4 illustrates an example transducer assembly including a forward scanning portion and a down scanning portion, in accordance with some embodiments discussed herein;

FIG. 5A illustrates a cross-sectional view of the transducer assembly of FIG. 4, in accordance with some embodiments discussed herein;

FIG. 5B illustrates a cross-sectional view of another example transducer assembly, in accordance with some embodiments discussed herein;

FIG. 6 illustrates a block diagram of an example marine electronic system, in accordance with some example embodiments discussed herein;

FIG. 7 illustrates a flowchart of example methods of operating a sonar transducer assembly according to some embodiments discussed herein; and FIG. 8 illustrates a flowchart of other example methods of operating a sonar transducer assembly according to some embodiments discussed herein.

DETAILED DESCRIPTION

Exemplary embodiments of the present invention now will be described more fully hereinafter with reference to the accompanying drawings, in which some, but not all embodiments of the invention are shown. Indeed, the invention may be embodied in many different forms and should not be construed as limited to the exemplary embodiments set forth herein; rather, these embodiments are provided so that this disclosure will satisfy applicable legal requirements. Like reference numerals refer to like elements throughout.

As depicted in FIG. 1, a watercraft, e.g. vessel 100, configured to traverse a marine environment, e.g. body of water 101, may use one or more sonar transducer assemblies 102a, 102b, and 102c disposed on and/or proximate to the vessel. The vessel 100 may be a surface watercraft, a submersible watercraft, or any other implementation known to those skilled in the art. The transducer assemblies 102a, 102b, and 102c may each include one or more transducer elements configured to transmit sound waves into a body of water, receive sonar return signals from the body of water, and convert the sonar return signals into sonar return data.

One or more sonar beams may be generated by the one or more transducer assemblies 102a, 102b, and 102c when deployed in the body of water 101. In some instances, a plurality of transducer elements may be embodied in a transducer assembly. In some instances, the transducer assembly may include one or more of a right scanning (e.g., sidescan) element, a left scanning (e.g., sidescan) element, a conical downscan sonar element, and/or a bar (e.g., linear, elongated rectangle, or the like) downscan sonar element, which may be housed within a transducer housing. In some example embodiments, the transducer assembly may be or include a transducer array, e.g. a "phased array." The transducer array may include a plurality of transducer elements arranged on a printed circuit board (PCB). The PCB may mechanically support and electrically connect the electronic components, including the transducer elements using conductive tracks (e.g. traces), pads, and other features. The conductive tracks may comprise sets of traces, for example, each transducer elements may be mounted to the PCB such that the transducer element is in electrical communication with a set of traces. Each transducer element, sub-array, and/or the array of transducer elements may be configured to transmit one or more sonar pulses and/or receive one or more sonar return signals.

The transducer arrays or individual transducer elements may transmit one or more sonar signals, e.g. sonar beams, into a body of water with a transmit transducer, a transmit/receive transducer, or similar device. When the sound waves, of the sonar beams, strike anything of differing acoustic impedance (e.g., the sea floor or something suspended in the water above the bottom), the sound waves reflect off that object. These echoes (or sonar return signals) may strike the transmitting transducer element and/or a separate one or more sonar receiver elements, which convert the echoes back into an electrical signal which is processed by a processor (e.g., processing circuity 407 and/or a sonar signal processor 449 as discussed in reference to FIG. 6) and sent to a display (e.g., an LCD) mounted in the cabin or other convenient location in the watercraft. This process is often called "sounding". Since the speed of sound in water may be determined by the properties of the water (approximately 4800 feet per second in fresh water), the time lapse between the transmitted signal and the received echoes can be measured and the distance to the objects determined. This process may repeat itself many times per second. The results of many soundings are used to build a picture on the display of the underwater environment, e.g. a sonar image.

In an example embodiment, the one or more transducers assemblies may include multiple transducer arrays and/or transducer elements cooperating to receive sonar return signals from the underwater environment. The transducer arrays and/or transducer elements may be arranged in a predetermined configuration, e.g. relative positions, including known distances between each transducer array or transducer element. The relative positions and known distances between the transducer array or transducer element may be used to resolve an angle associated with the sonar returns (and, for example, a corresponding object in the underwater environment). The respective angles determined by the relative positions and known distances of the transducer arrays or transducer elements may be compared and combined to generate a two-dimensional and/or a three-dimensional position of the sonar return signals (and, for example, a corresponding object in the underwater environment).

In some example embodiments, the returns from a plurality of the transducer arrays and/or transducer elements may be compared via the process of interferometry to generate one or more angle values. Interferometry may involve determining the angle to a given sonar return signal via a phase difference between the returns received at two or more transducer arrays and/or transducer elements. In some embodiments, the process of beamforming may be used in conjunction with the plurality of transducer arrays and/or transducer elements to generate one or more angle values associated with each sonar return signal. Beamforming may involve generating a plurality of receive-beams at predetermined angles by spatially defining the beams based on the relative phasing of the sonar returns and detecting the distance of the sonar returns in each respective beam. Beamforming and interferometry are further described in U.S. patent application Ser. No. 14/717,458, entitled "Sonar Systems using Interferometry and/or Beamforming for 3D Imaging", published as US 2016/0341827, and U.S. Pat. No. 9,739,884, entitled Systems and Associated Methods for Producing a 3D Sonar Image," both of which are assigned to the Assignee of the present application and are hereby incorporated by reference herein in their entireties.

In an example embodiment, a vessel 100 may include a main propulsion motor 105, such as an outboard or inboard motor. Additionally, the vessel 100 may include trolling motor 108 configured to propel the vessel 100 or maintain a position. The one or more transducer assemblies (e.g., 102a, 102b, and/or 102c) may be mounted in various positions and to various portions of the vessel 100 and/or equipment associated with the vessel 100. For example, the transducer assemblies may be mounted to the transom 106 of the vessel 100, such as depicted by transducer assembly 102a, may be mounted to the bottom or side of the hull 104 of the vessel 100, such as depicted by transducer assembly 102b, or may be mounted to the trolling motor 108, such as depicted by transducer assembly 102c.

Example Transducer Assemblies

FIGS. 2A, 2B, 2C, 2D, 4, 5A, and 5B illustrate some example embodiments of transducer assemblies and transducer element arrangements therein.

FIGS. 2A and 2B depict a transducer assembly including a transducer housing 200 having a poly-geometric transducer element arrangement. The transducer housing may include a first emitting transducer element 202 and a second emitting transducer element (204 in FIG. 2A or 205 in FIG. 2B). Each of the emitting transducer elements 202, 204, 205 may be configured to transmit one or more sonar signals into the underwater environment via at least one emitting face of each of the emitting transducer elements 202, 204, 205. The shape of the emitting face of the emitting transducer element 202, 204, 205 may shape the sonar beam emitted therefrom.

In the examples depicted in FIGS. 2A and 2B, the first emitting transducer element 202 has an emitting face in the shape of with an elongated rectangle. As used herein "elongated" should be interpreted as having a length (L) that is substantially longer that the width (W). The first emitting transducer element 202, being a piezoelectric crystalline structure, may emit the first sonar signals into the body of water by converting electrical energy into vibrational energy, which is thereby transferred into the water surrounding the transducer assembly. As the vibrations travel away from the emitting face of the first emitting transducer element 202 a fan-shaped sonar beam 220, such as depicted in FIG. 3A, may be formed (e.g., at −3 dB). The fan-shaped beam 220 may produce sonar returns with high structure detail and relatively low fish detail when rendered in a sonar image, which may be due to the relatively wide section and the relatively narrow section of the fan-shaped beam.

Turning to the second emitting transducer elements 204 and 205 depicted in FIGS. 2A and 2B, respectively, the second emitting transducer element 204 is a substantially cubic rectangular prism with a substantially square emitting face and the second emitting transducer element 205 is substantially a cylinder with a substantially circular emitting face. As the vibrations of the sonar signal travel away from the emitting face, a cone-shaped beam 230, such as depicted in FIG. 3A, may be formed (e.g., at −3 dB). The conical beam 230 may produce sonar returns with high fish detail and relatively low structural detail when rendered in a sonar image, which may be due to the relatively wide beam shape.

Although an elongated rectangular emitting face and a circle or square emitting face are depicted, any emitting face shape may be substituted. The level of detail for both fish and structure may shift respectively as the shape of the resultant beam transitions between the fan shape and the conical shape. In some example embodiments a first length-to-width ratio (L1/W1) of the first emitting transducer element 202 may be larger than a second length-to-width ratio (L2/W2) of the second emitting transducer element 204, 205, such that each has a differently shaped beam and therefore different resultant sonar image characteristics.

FIG. 2C illustrates another example transducer assembly that includes an array of transmit transducer elements 207 instead of the transmit transducer elements 202, 204, 205 shown in FIGS. 2A and 2B. Notably, in some embodiments, an array of transmit transducer elements (e.g., 207) may be included along with other transmit transducer elements, such as the transmit transducer elements shown in FIGS. 2A and 2B.

In some embodiments, the array of transmit transducer elements 207 may be made up of a plurality of transmit transducer elements 209 that are electrically connected in series to transmit sonar signals within a beam pattern (e.g., beam shape). In the depicted embodiment, the array is formed of three transducer elements 209a, 209b, and 209c that each have a length that is greater than their width (although other shapes of the elements and number of elements are contemplated). Further, the lengths of the elements are arranged in a line (e.g., end-to-end or near end-to-end) with respect to the horizontal plane (e.g., from the plan perspective shown in FIG. 2C). In this manner, the resultant beam may be wide in the perpendicular direction (e.g., along the line $P_{Centerline}$ or in the front-to-back direction of the watercraft—although other mounting orientations are contemplated).

Additionally, in some embodiments, the emitting faces of each of the transducer elements 209a, 209b, 209c may be oriented differently with respect to the surface of the water such that the "effective" emitting face of the array mimics a convex curved surface—thereby resulting in a wide beam coverage in the other direction (e.g., perpendicular to the line $P_{Centerline}$ or in the port-to-starboard direction of the watercraft). Thus, a resulting beam may be relatively wide in both directions. For example, some example beam shapes provide a 50 degree by 50 degree beam shape (e.g., at −3 dB), although other example beam shapes are contemplated, such as a ~30-60 degree by ~20-50 degree beam shape.

FIG. 2D illustrates a cross-sectional view of an example array of emitting transducer elements 207. In the depicted embodiment, the array 207 includes a center transmit transducer element 209b, a left transmit transducer element 209a, and a right transmit transducer element 209c. The center transmit transducer element 209b is mounted in the center of the array 207 and includes an emitting face 212b that is oriented in a first direction 211b and generally at a first angle βb with respect to a mounting plane $P_{Mounting}$ (which may correspond to a theoretical waterline if the array 207 is mounted so as to be oriented generally downward). The left transmit transducer element 209a is mounted to the left of the center transmit transducer element 209b and includes an emitting face 212a that is oriented in a second direction 211a and generally at a second angle βa with respect to the mounting plane $P_{Mounting}$. The right transmit transducer element 209c is mounted to the right of the center transmit transducer element 209b and includes an emitting face 212c that is oriented in a third direction 211c and generally at a third angle βc with respect to the mounting plane $P_{Mounting}$. Thus, the second angle βa (corresponding to the left transmit transducer element) and the third angle βc (corresponding to the right transmit transducer element) are less than the first angle βb (corresponding to the center transmit transducer element). In this regard, there is an angle difference θa between the second angle βa and the first angle βb and an angle difference θb between the third angle βc and the first angle βb. In some embodiments, the angle differences may be the same such that the orientation of the emitting faces of the left and right transmit transducer elements are symmetrical with respect to the center transmit transducer element. For example, the angle difference θa, θb may be between 5 degrees and 20 degrees, such as 15 degrees. In such example embodiments, the resulting array 207 includes emitting faces of the transmit transducer elements that form effectively a curved surface (e.g., since the elements are connected in series and are configured to transmit together). As noted herein, having an effective curved surface results in a wider beam in the plane corresponding to the curved surface.

Example beam patterns 240, 240' that may result from such an example array are shown in FIGS. 3B and 3C depending on the orientation and mounting position of the transducer housing 200. For example, FIG. 3B illustrates a resulting beam pattern 240 with the transducer housing mounted facing generally downwardly, whereas FIG. 3C illustrates a resulting beam pattern 240' with the transducer housing mounted facing forward of the watercraft 100.

Notably, in some embodiments that utilize such an example array of transmit transducer elements, such a structured array may provide a beneficial beam pattern that is a good compromise between high-definition imagery and good fish or lure tracking. In this regard, some traditional transducer arrangements may produce a beam that is wide in one direction and narrow in another, which may provide high-definition structure, but lack the ability to track fish or lures due to the narrow beam width in one direction. Some embodiments that utilize an array of transmit transducers that are electrically connected in series and form an effective curved emission surface may provide a more beneficial beam pattern for generating high-definition imagery but also enabling better fish and/or lure tracking (e.g., as the beam width in both directions is sufficient to enable fish/lure tracking).

The transducer housing 200 may also include one or more receiving transducer elements 206, such as an array of receive transducer elements. The receiving transducer elements 206 may be configured to receive sonar returns from the first sonar signals emitted from the first emitting transducer element 202 and the second emitting transducer element 204, 205. In some embodiments, to facilitate receiving sonar returns from both the first emitting transducer element 202 and the second emitting transducer element 204, 205 without some interference, the first and second emitting transducer elements may be configured to transmit during distinct, e.g. separate, time periods. For example, the first emitting transducer element 202 and the second emitting transducer element 204, 205 may alternately transmit, such that only the first or the second emitting transducer element is transmitting at any one time.

Additionally or alternatively, the first emitting transducer element 202 and the second emitting transducer element 204, 205 may be configured to transmit at different frequencies. For example the first emitting transducer element 202 may be configured to transmit at a first frequency and the second emitting transducer element 204, 205 may be configured to transmit at a second frequency, which is different than the first frequency. The first frequency may be a bandwidth that is sufficiently different from a bandwidth of the second frequency to prevent interface from the other of the emitting transducer elements.

In some example embodiments, the receiving transducer element 206 may be a single transducer element, e.g. piezoelectric crystalline structure, configured to convert the vibrations of the sonar returns into an electrical signal for processing by a sonar signal processor, as discussed below. In an example embodiment, the receiving transducer element 206 may be a transducer array including a plurality of individual transducer elements 208 arranged in a linear array. In some example embodiments, the receiving transducer element 206 may include a plurality of individual transducer elements 208 arranged in a first linear array and a second linear array, similar to the receiving transducers 314A and 314B depicted in FIG. 4. In some embodiments, the longitudinal axis of the first linear array may be perpendicular to longitudinal axis of the second linear array.

Referring to FIG. 6, a sonar signal processor 449 may receive, via the receiving transducer 206, one or more sonar returns from the sonar signals transmitted by the first emitting transducer element 202 and one or more second sonar returns from the sonar signals transmitted by the second emitting transducer element 204, 205. In an example embodiment, the sonar signal processor 449 may receive the sonar return data from the receiving transducer element 206 as a data stream or feed, such as in an instance in which the receiving transducer element is a single transducer element. In some example embodiments, the sonar return data may be multiplexed or otherwise addressed by the sonar signal processor 449, such that the sonar returns are identifiably received from the first linear array, the second linear array, and/or individual transducer elements 208.

The sonar signal processor 449 may be configured to generate sonar image data from both the first sonar returns and second sonar returns. The sonar image data may form a sonar image representing the underwater environment, including without limitation 2D sonar images, 3D sonar images, such as based on interferometry of the sonar image data corresponding to the first emitting transducer element 202 and the second emitting transducer element 204, 205, and/or live 2D or 3D sonar images of the underwater environment.

In an example embodiment, the processing circuitry 407 may be configured to cause one or more sonar images to render (e.g., present) on the display 440. In some example embodiments, the processing circuitry 407 may determine which sonar images to display based on user input on a user interface 435. The determined sonar image for display may be a sonar image based on the first sonar return, a sonar image based on the second sonar image, or a blended sonar image based on the sonar data associated with both the first sonar return and the second sonar return.

In an example embodiment, the blended sonar image may include sonar image data from both the first sonar return and the second sonar return. In some embodiments, the processing circuitry 407 renders the sonar image data for both sonar returns together to generate the blended image without further processing. In some example embodiments, the processing circuitry 407 may determine a desired blend ratio and generate the blended sonar image based on the blend ratio. The blend ratio may be automatically determined, such as a preprogramed blend ratio or may be based on a user input on the user interface.

The processing circuitry 407 may utilize brightness, transparency, or other suitable image overlay contrasting. For example, the processing circuitry 407 may generate a blended sonar image with a 50/50 contrast, such that the sonar image data from each of the first and second sonar returns is given equal weight. The processing circuitry 407 may generate further blended sonar images at different contrast levels based on a user input, such as increasing the weight of the second sonar image data associated with the second emitting transducer element 204, 205 when attempting to locate fish. In another example, the user input may cause an increase to the weight of the first sonar image data associated with the first emitting sonar transducer 202 when attempting to move the vessel to a new location on the body of water, such when structural information is important for safety and/or determining a quality fishing location.

Additionally or alternatively, the processing circuitry 407 may be configured to receive propulsion information from a propulsion system 409, such as operating conditions of the main propulsion engine 105 and/or trolling motor 108. The processing circuitry 407 may determine a blend ratio with a higher weight for the second sonar image data associated with the second emitting transducer element 204, 205 when the propulsion information indicates that the vessel 100 is stationary, below a predetermined movement threshold, such as 2 knots, and/or the main propulsion engine 105 and/or trolling motor are not operating. Similarly, the processing circuitry 407 may determine a blend ratio with a higher weight for the first sonar image data associated with the first emitting transducer element 202 when the propulsion information indicates that the vessel 100 is moving greater than a predetermined movement threshold, such as 2 knots, and/or the main propulsion engine 105 and/or trolling motor are operating.

The above described transducer assembly 200 may enable rendering of sonar images including either, or both, the high structural detail and the high fish detail. Additionally, since sonar return data is transmitted by two separate emitting transducer elements and received by a common receiving transducer element 206, the sonar images may be live, e.g., real time or near real time, 2D or 3D sonar images of underwater environment.

In some embodiments, an array of receive transducer elements (e.g., the array 206) may be used to form traditional sonar images, such as one-dimensional (1D) (e.g., time-based) sonar images. For example, the sonar signal processor 449 may be configured to sum the sonar return data received from one or more individual receive transducer elements 208 of the receive array. In this regard, in some embodiments, one or more multiplexers or other devices may be used to enable selection of receipt of sonar return data from each of the individual receive transducer elements—enabling selection of the sonar return data from specific receive transducer elements.

Depending on which receive transducer elements are utilized and summed, different levels of definition of the resulting sonar image can be obtained. For example, in the situation where the array includes a large ratio of length to width (e.g., 3:1 or greater), then summing the sonar return data from all or most of the individual receive transducer elements results in a 1D sonar image with relatively high-definition (e.g., which may be equivalent to a sonar image formed using a linear (e.g., rectangular-shaped) transducer element). For example, the sonar signal processor 449 may select to receive and sum the sonar return data from all of the received elements 208 of the array 206 shown in FIGS. 2A-2C. By performing a straight summation of the sonar return data, the resulting summed sonar return data can be used to form a 1D (time-based) waterfall sonar image. Further, by summing the sonar return data from all the receive transducer elements, the effective beam shape corresponding to the summed sonar return data corresponds to a similar beam shape of a traditional linear (e.g., rectangular-shaped) transducer element and, thus, a similarly high-definition of sonar imagery.

Along similar lines, summing the sonar return data from a small subgroup of individual receive transducer elements (e.g., 1-4 elements) results in a 1D sonar image with relatively lower definition (e.g., which may be equivalent to a sonar image formed using a conical (e.g., circular-shaped) transducer element). For example, the sonar signal processor 449 may select to receive and sum the sonar return data from only the four receive elements 208a-d of the array 206 shown in FIG. 2B, which may correspond to the receive transducer elements that are located in the center of the array 206. In this regard, a small number of receive transducer elements may be chosen and, in some cases, the center receive transducer element(s) may be chosen. By performing a straight summation of the sonar return data, the resulting summed sonar return data can be used to form a 1D (time-based) waterfall sonar image. Further, by summing the sonar return data from only the subgroup of receive transducer elements, the effective beam shape corresponding to the summed sonar return data corresponds to a similar beam shape of a traditional conical (e.g., circular-shaped) transducer element and, thus, a similarly lower-definition of sonar imagery. Notably, in addition to being commonly used, such a sonar image also produces fish arches, which is desirable to many anglers.

Notably, variations of summed sonar return data and relative positioning of the selected receive transducer elements to produce different sonar images are, thus, contemplated by various embodiments herein.

Additionally, as noted herein, the array of receive transducer elements 206 may be used to form two-dimensional (2D) or three-dimensional (3D) sonar return data that can be used to generate a 2D or 3D sonar image. In this regard, the sonar signal processor 449 may be configured to utilize sonar return data from two or more of the receive transducer elements 208 to generate the 2D or 3D sonar return data, such as using interferometry and/or beamforming as described herein.

In some embodiments, the marine system that utilizes such example transducer assemblies may be configured to enable selection of sonar images corresponding to each of the above example sonar images being generated, such that the array of receive transducer elements may be used to create each and/or all of the above noted sonar images, e.g., corresponding to summed sonar return data and/or 2D/3D sonar return data. A display of the system may, thus, be configured to present each of the sonar images and may be configured to simultaneously present the sonar images, as the sonar return data may be gathered and processed simultaneously.

FIG. 4 illustrates a transducer assembly having a transducer housing 300 including a forward scanning portion 302 and down scanning portion 304. The forward scanning portion 302 may include an emitting element 306 and one or more receiving arrays 308A, 308B. The emitting element 306 may be configured to transmit one or more first sonar signals into the body of water, such as in a manner similar to the emitting transducer elements discussed above. Although, only a single emitting transducer element 306 is depicted, a transducer element configuration similar to the transducer assembly illustrated in FIG. 2A or 2B may substituted for additional functionality.

Each receiving array 308A, 308B may include a plurality of individual transducer elements 310, e.g. piezoelectric crystalline structures, arranged in a linear array. In some embodiments, the individual transducer elements 310 may be arranged in a first linear array 308A and a second linear array 308B. A longitudinal axis of the first linear array 308A may be perpendicular to a longitudinal axis of the second linear array 308B. Similar to the operation of the receiving element 206 discussed above in reference to FIGS. 2A and 2B, the individual transducer elements 310 may convert the vibrational energy of reflected sonar signals, e.g. sonar returns, into an electrical signal. The sonar signal processor 449 (FIG. 6) may receive one or more sonar returns from the receiving transducer arrays 308A, 308B. In an example embodiment, the sonar signal processor 449 may receive the sonar return data from the receiving transducer arrays 308A, 308B as a data stream or feed. In some example embodiments, the sonar return data may be multiplexed or otherwise addressed by the sonar signal processor 449, such that the sonar returns are identifiably received from the first linear array 308A, the second linear array 308B, and/or individual transducer elements 310.

The down scanning portion 304 may include an emitting transducer element 312 and one or more receiving transducer arrays 314A, 314B. In some example embodiments, the down scanning portion 304 may also include a second emitting element 316, which may have a different emitting face shape, such as an elongated rectangular emitting face. The emitting transducer element 312 and/or 316 may be configured and operate with the receiving transducer array(s) 314A, 314B in a manner similar to the transducer assemblies discussed in FIGS. 2A and 2B and/or the down transducer assembly of the down scanning portion 302 discussed above.

FIGS. 5A and 5B illustrate cross-sectional views of example transducer assemblies, such as the transducer assembly of FIG. 4, in accordance with some embodiments. The transducer housing 300 may be configured to retain the forward scanning portion 302 and the down scanning portion 304. When the transducer housing 300 is mounted to a vessel 100, the down scanning portion 304 may face substantially downward into the body of water 101 in a horizontal plane parallel to the surface of the body of water, such that the downward scanning portion 304 transmits one or more sonar signals in a generally downward direction. The forward scanning portion 302 may face at least partially forward and angle out of the horizontal plane by a predetermined amount or angle, such as 30 degrees, 45 degrees, or other suitable angle, such that the forward scanning portion 302 transmits sonar signals into the body of water in a generally forward and downward direction.

In some instances, a blind spot 318 may be created by the difference in transmission and receiving angles of the forward scanning portion 302 and down scanning portion 304, as shown in FIG. 5A. The blind spot 318 may be mitigated or eliminated by reduction of the angle difference between the forward scanning portion 302 and the down scanning portion 304. Additionally or alternatively, the forward scanning portion 302' may be curved, as depicted in FIG. 5B, to mitigate or eliminate the blind spot 318. In an example embodiment, the forward scanning portion 302' is curved from a forward end to an aft end, such that the aft end of the forward scanning portion is substantially in the horizontal plane.

Referring also to FIG. 6, the sonar signal processor 449 may be configured to generate sonar image data based on each of sonar returns received from both the receiving transducer array(s) 308A, 308B of the forward scanning portion 302 and the receiving transducer array(s) 314A, 314B of the down scanning portion 304. The processing circuitry 407 may receive the sonar image data from the sonar signal processor 449 and cause one or more sonar images to be presented on a user interface. The sonar images may be 2D sonar images, 3D sonar images, blended sonar images, or the like based on the sonar returns from the forward scanning portion 302 and/or the down scanning portion 304.

In some example embodiments, the sonar signal processor 449 and/or the processing circuitry 407 may generate a continuous sonar image based on both the sonar returns from the forward scanning portion 302 and the down scanning portion 304. In one such embodiment, the sonar signal processor 449 and/or the processing circuitry 407 may register the common edge of the sonar image based on the sonar return from the forward scanning portion 302 and the sonar image based on the sonar return from the down scanning portion 304. The sonar signal processor and/or the processing circuitry 407 may then stitch the common edges of the sonar images together based on the registration.

As discussed above the one or more generated sonar images may be rendered on the display 440. The processing circuitry 407 may automatically determine the sonar image to display, such as due to operational conditions, discussed below, or preprogrammed default selection. Additionally or alternatively, the processing circuitry 407 may determine the sonar image to render on the display based on user input on the user interface 435.

In an example embodiment, the processing circuitry 407 may be configured to render one or more sonar images based on the operational condition of the vessel, which may be based on propulsion information received from the propulsion system 409. For example, the processing circuitry 407 may render a downscan sonar image in an instance in which the vessel 100 is stationary or moving less than a predetermined threshold, such as 2 knots, or the main propulsion engine 105 and/or the trolling motor 108 is not operating. The processing circuitry 407 may render a forwardscan sonar image in an instance in which the vessel 100 is moving greater than a predetermined threshold, such as 2 knots, or the main propulsion engine 105 and/or the trolling motor 108 is operating. Additionally or alternatively, the processing circuitry 407 may pan a continuous sonar image based on the operational condition of the propulsion system 409. For example, the processing circuitry 407 may pan the continuous sonar image toward the downscan portion of the image when the propulsion information indicates the vessel 100 is relatively stationary and toward the forwardscan portion when the propulsion information indicates movement of the vessel 100.

Example Architecture

FIG. 6 shows a block diagram of computing device, such as user device 403. The depicted computing device is an example marine electronic device 405. The marine electronic device 405 may include a number of different modules or components, each of which may comprise any device or means embodied in either hardware, software, or a combination of hardware and software configured to perform one or more corresponding functions. The marine electronic device may also be in communication with a network 402.

The marine electronic device 405 may also include one or more communications modules configured to communicate with one another in any of a number of different manners including, for example, via a network. In this regard, the communications module may include any of a number of different communication backbones or frameworks including, for example, Ethernet, the NMEA 2000 framework, GPS, cellular, WiFi, or other suitable networks. The network may also support other data sources, including GPS, autopilot, engine data, compass, radar, etc. Numerous other peripheral devices such as one or more wired or wireless multi-function displays may be included in a marine system 400.

The marine electronic device 405 may include a processor 410, a memory 420, a user interface 435, a display 440, one or more sensors (e.g. position sensor 445, other sensors 447, etc.), and a communication interface 430.

The processor 410 may be any means configured to execute various programmed operations or instructions stored in a memory device such as a device or circuitry operating in accordance with software or otherwise embodied in hardware or a combination of hardware and software (e.g. a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor 410 as described herein. In this regard, the processor 410 may be configured to analyze electrical signals communicated thereto to provide or receive sonar data, sensor data, location data, and/or additional environmental data. For example, the processor 410 may be configured to receive sonar return data, generate sonar image data, and generate one or more sonar images based on the sonar image data.

In some embodiments, the processor 410 may be further configured to implement signal processing or enhancement features to improve the display characteristics or data or images, collect or process additional data, such as time, temperature, GPS information, waypoint designations, or others, or may filter extraneous data to better analyze the collected data. It may further implement notices and alarms, such as those determined or adjusted by a user, to reflect depth, presence of fish, proximity of other vehicles, e.g. watercraft, etc.

In an example embodiment, the memory 420 may include one or more non-transitory storage or memory devices such as, for example, volatile and/or non-volatile memory that may be either fixed or removable. The memory 420 may be configured to store instructions, computer program code, marine data, such as sonar data, chart data, location/position data, and other data associated with the navigation system in a non-transitory computer readable medium for use, such as by the processor for enabling the marine electronic device 405 to carry out various functions in accordance with example embodiments of the present invention. For example, the memory 420 could be configured to buffer input data for processing by the processor 410. Additionally or alternatively, the memory 420 could be configured to store instructions for execution by the processor 410.

The communication interface 430 may be configured to enable connection to external systems (e.g. an external network 402). In this manner, the marine electronic device 405 may retrieve stored data from a remote server 460 via the external network 402 in addition to or as an alternative to the onboard memory 420. Additionally or alternatively, the marine electronic device may transmit or receive data, such as sonar signals, sonar returns, sonar image data or the like to or from a transducer assembly 407, more particularly to or from a sonar signal processor 449. In some embodiments, the marine electronic device may also be configured to communicate with a propulsion system 409 of the vessel 100. The marine electronic device may receive data indicative of operation of the propulsion system, such as engine or trolling motor running, running speed, or the like.

The position sensor 445 may be configured to determine the current position and/or location of the marine electronic device 405. For example, the position sensor 445 may comprise a GPS, bottom contour, inertial navigation system, such as machined electromagnetic sensor (MEMS), a ring laser gyroscope, or other location detection system.

The display 440, e.g. screen, may be configured to display images and may include or otherwise be in communication with a user interface 435 configured to receive input from a user. The display 440 may be, for example, a conventional LCD (liquid crystal display), a touch screen display, mobile device, or any other suitable display known in the art upon which images may be displayed.

In any of the embodiments, the display 440 may present one or more sets of marine data (or images generated from the one or more sets of data). Such marine data includes chart data, radar data, weather data, location data, position data, orientation data, sonar data, or any other type of information relevant to the watercraft. In some embodiments, the display 440 may be configured to present such marine data simultaneously as one or more layers or in split-screen mode. In some embodiments, a user may select any of the possible combinations of the marine data for display.

In some further embodiments, various sets of data, referred to above, may be superimposed or overlaid onto one another. For example, a route may be applied to (or overlaid onto) a chart (e.g. a map or navigational chart). Additionally or alternatively, depth information, weather information, radar information, sonar information, or any other navigation system inputs may be applied to one another.

The user interface 435 may include, for example, a keyboard, keypad, function keys, mouse, scrolling device, input/output ports, touch screen, or any other mechanism by which a user may interface with the system.

Although the display 440 of FIG. 6 is shown as being directly connected to the processor 410 and within the marine electronic device 405, the display 440 could alternatively be remote from the processor 410 and/or marine electronic device 405. Likewise, in some embodiments, the position sensor 445 and/or user interface 435 could be remote from the marine electronic device 405.

The marine electronic device 405 may include one or more other sensors 447 configured to measure environmental conditions. The other sensors 447 may include, for example, an air temperature sensor, a water temperature sensor, a current sensor, a light sensor, a wind sensor, a speed sensor, or the like.

The transducer assembly 462 may have one or more transducers (e.g., transducers 468, 469), such as a plurality of scanning portions 302, 304 (such as discussed in reference to FIGS. 4-5B) and/or various emitting or receiving transducers (such as discussed in reference to FIGS. 2A-2D). The transducer assembly 462 may also include a sonar signal processor 449 configured to receive one or more sonar returns and determine sonar image data. In some embodiments, the sonar signal processor 465 may be configured to select individual transducer elements to gather sonar return data and/or cause transmission, such as through a multiplexer 466. Although depicted in the transducer assembly 462, it would be immediately understood by one of ordinary skill in the art, that the sonar signal processor 449 may be a portion of the user device 403, the marine electronic device, the processing circuitry 407, the processor 410, or another remote device/system.

The propulsion system 409 may include the main propulsion motor 105 and/or trolling motor 108. The propulsion motor 105 and/or the trolling motor 108 may include one or more sensors to measure operation or speed of main propulsion motor 105 and/or the trolling motor 108.

Example Flowchart(s) and Operations

Embodiments of the present invention provide methods, apparatus and computer program products for operating a transducer assembly. Various examples of the operations performed in accordance with embodiments of the present invention will now be provided with reference to FIGS. 7-8.

FIG. 7 illustrates a flowchart according to example methods for operating a sonar transducer according to an example embodiment. The operations illustrated in and described with respect to FIG. 7 may, for example, be performed by, with the assistance of, and/or under the control of one or more of the processor 410, memory 420, communication interface 430, user interface 435, position sensor 445, other sensor 447, transducer assembly 462, sonar signal processor 449, display 440, and/or propulsion system 409. The method may include receiving first sonar return data from one or more first sonar signals at operation 502, receiving second sonar return data from one or more second sonar signals at operation 504, and determining sonar image data based on both the first sonar return data and the second sonar return data at operation 508.

In some embodiments, the method may include additional, optional operations, and/or the operations described above may be modified or augmented. Some examples of modifications, optional operations, and augmentations are described below, as indicated by dashed lines, such as, determining a desired blend ratio at operation 506 and causing presentation of the sonar image on a user interface at operation 510.

FIG. 8 illustrates a flowchart according to example methods for operating a sonar transducer assembly according to an example embodiment. The operations illustrated in and described with respect to FIG. 8 may, for example, be performed by, with the assistance of, and/or under the control of one or more of the processor 410, memory 420, communication interface 430, user interface 435, position sensor 445, other sensor 447, transducer assembly 462, sonar signal processor 449, display 440, and/or propulsion system 409. The method may include causing transmission of sonar signals at operation 602, receiving sonar return data from one or more transducer elements at operation 604, processing and/or summing some or all of the received sonar return data at operation 606, generating corresponding sonar image data at operation 608, and causing presentation of the sonar image(s), such as on a user interface at operation 610.

FIGS. 7-8 illustrate flowcharts of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 420 and executed by, for example, the processor 410. As will be appreciated, any such computer program product may be loaded onto a computer or other programmable apparatus (for example, a marine electronic device 405) to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device (for example, a marine electronic device 405) to cause a series of operations to be performed on the computer or other programmable apparatus to produce a computer-implemented process such that the instructions which execute on the computer or other programmable apparatus implement the functions specified in the flowchart block(s).

Additional Example Embodiments

In an example embodiment, a system for imaging an underwater environment is provided including a transducer housing including a first transducer element configured to transmit one or more first sonar signals into a body of water and a second transducer element configured to transmit one or more second sonar signals into the body of water. A length-to-width ratio of an emitting face of the first transducer element is larger than a length-to-width ratio of an emitting face of the second transducer element. The transducer housing also includes a sonar signal processor and at least one third transducer element configured to receive one or more first sonar returns from the one or more first sonar signals and one or more second sonar returns from the one or more second sonar signals. The sonar signal processor is configured to receive the one or more first sonar returns, receive the one or more second sonar returns, and determine sonar image data based on both the one or more first sonar returns and the one or more second sonar returns. The sonar image data forms a sonar image representing the underwater environment. In an example embodiment, the marine electronic device also includes a user interface including a display, a marine electronic device processor, and a memory including computer program code. The computer program code is configured to, with the marine electronic device processor, cause the marine electronic device to receive the sonar image data from the sonar signal processor and cause presentation of the sonar image, based on the sonar image data. The sonar image includes a real time representation of the underwater environment.

In some example embodiments, the sonar signal processor and memory are further configured to determine a desired blend ratio of the first sonar return data and second sonar return data and determine the sonar image data by blending the first sonar return data and the second sonar return data based on the desired blend ratio. In an example embodiment, the emitting face of the first transducer element defines a rectangular shape of a first size and the emitting face of the second transducer element defines a rectangular shape of a second size. In some example embodiments, the emitting face of the first transducer element defines a rectangular shape and the emitting face of the second transducer element defines a circular shape. In an example embodiment, the second emitting face defines a second shape that is different than a first shape of the first emitting face. In some example embodiments, the first transducer element is configured to transmit the one or more first sonar signals in a fan-shaped sonar beam and the second transducer element is configured to transmit the one or more second sonar signals in a cone-shaped sonar beam. In an example embodiment, the first transducer element transmits the one or more first sonar signals during a first time period and the second transducer element transmits the one or more second sonar signals during a second time period. The first time period is separate from the second time period. In some example embodiments, the first transducer element transmits the one or more first sonar signals at a first frequency and the second transducer element transmits the one or more second sonar signals at a second frequency. The first frequency is different from the second frequency. In some example embodiments, the at least one third transducer element includes a plurality of transducer elements arranged in a linear array.

In a further example embodiment, a transducer assembly is provided including a transducer housing defining a forward scanning portion and a down scanning portion. The down scanning portion includes a first transducer element configured transmit one or more first sonar signals in a generally forward and downward direction into a body of water, a first transducer array configured to receive one or more first sonar returns from the one or more first sonar signals and including a first plurality of transducer elements arranged in a first linear array, and a second transducer array configured to receive one or more second sonar returns from the one or more first sonar signals and including a second plurality of transducer elements arranged in a second linear array. A longitudinal axis of the first linear array is perpendicular to a longitudinal axis of the second linear array. The down scanning portion includes a second transducer element configured to transmit one or more second sonar signals in a generally downward direction into the body of water; a third transducer array configured to receive one or more third sonar returns from the one or more second sonar signals and including a third plurality of transducer elements arranged in a third linear array; and a fourth transducer array configured to receive one or more fourth sonar returns from the one or more second sonar signals and including a fourth plurality of transducer elements arranged in a fourth linear array. A longitudinal axis of the third linear array is perpendicular to a longitudinal axis of the fourth linear array.

In an example embodiment, the forward scanning portion defines a curved surface extending from a forward end to a rear end, such that the surface at the rear end of the forward scanning portion is substantially in the horizontal plane that is parallel to a surface of the body of water.

An example embodiment of the present invention includes an example sonar transducer. The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Moreover, the claimed subject matter is not limited to implementations that solve any or all disadvantages noted in any part of this disclosure.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

That which is claimed:

1. A system for imaging an underwater environment of a body of water, the system comprising:
   a transducer assembly comprising:
      at least one transmit transducer element configured to transmit sonar signals into the underwater environment;
      an array of a plurality of receive transducer elements, wherein the array of the plurality of receive transducer elements defines a length and a width with a ratio of the length to the width being at least 3:1, wherein each of the plurality of receive transducer elements is configured to receive sonar returns from the sonar signals and form corresponding sonar return data, wherein at least two of the plurality of receive transducer elements define a same element shape; and
   a sonar signal processor configured to:
      receive the sonar return data from each of the plurality of receive transducer elements of the array;
      sum the sonar return data from all of the plurality of receive transducer elements to form summed sonar return data; and
      generate sonar image data based on the summed sonar return data, wherein the sonar image data forms a one-dimensional downward sonar image representing the underwater environment beneath the watercraft; and
   a marine electronic device comprising:
      a user interface comprising a display;
      a marine electronic device processor; and
      a memory including computer program code configured to, with the marine electronic device processor, cause the marine electronic device to:
         receive the sonar image data from the sonar signal processor; and
         cause presentation of the sonar image, based on the sonar image data;
   wherein the transducer assembly is configured to be mounted to a watercraft such that the array of the plurality of receive transducer elements is oriented downwardly with the length extending in a first direction that runs generally parallel with a centerline of the watercraft and the width extending in a second direction running from a port side of the watercraft to a starboard side of the watercraft.

2. The system of claim 1, wherein the array of the plurality of receive transducer elements comprises at least 8 receive transducer elements.

3. The system of claim 2, wherein the sonar signal processor is further configured to:
   sum the sonar return data from a subgroup of the plurality of receive transducer elements to form second summed sonar return data, wherein the subgroup of the plurality of receive transducer elements is less than all of the plurality of receive transducer elements; and
   generate second sonar image data based on the second summed sonar return data, wherein the second sonar image data forms a second sonar image representing the underwater environment.

4. The system of claim 3, wherein the subgroup of the plurality of receive transducer elements includes at least two receive transducer elements that are located generally in the center of the array of receive transducer elements.

5. The system of claim 3, wherein the computer program code is further configured to, with the marine electronic device processor, cause the marine electronic device to:
   enable selection by a user of at least the sonar image and the second sonar image;
   cause, in response to receiving a selection of the sonar image, presentation of the sonar image, based on the sonar image data; and
   cause, in response to receiving a selection of the second sonar image, presentation of the second sonar image, based on the second sonar image data.

6. The system of claim 5, wherein the second sonar image forms a second downward sonar image representing a one-dimensional image of the underwater environment beneath the watercraft, wherein the definition of objects within the sonar image is greater than the definition of objects within the second sonar image.

7. The system of claim 1, wherein the sonar signal processor comprises a multiplexer such that sonar return data from each of the plurality of receive transducer elements can be selected individually for summation.

8. The system of claim 1, wherein the sonar signal processor is further configured to:
   process the sonar return data from each of the plurality of receive transducer elements to form two-dimensional (2D) or three-dimensional (3D) sonar return data; and
   generate 2D or 3D sonar image data based on the 2D or 3D sonar return data, wherein the 2D or 3D sonar image data forms a 2D or 3D sonar image representing the underwater environment.

9. The system of claim 8, wherein the computer program code is further configured to, with the marine electronic device processor, cause the marine electronic device to:
   enable selection by a user of at least the sonar image and the 2D or 3D sonar image;
   cause, in response to receiving a selection of the sonar image, presentation of the sonar image, based on the sonar image data; and
   cause, in response to receiving a selection of the 2D or 3D sonar image, presentation of the 2D or 3D sonar image, based on the 2D or 3D sonar image data.

10. The system of claim 1, wherein the at least one transmit transducer comprises one of a rectangular transducer element, a conical transducer element, a square transducer element, or an array of transducer elements.

11. The system of claim 1, wherein the at least one transmit transducer comprises an array of a plurality of transmit transducer elements electrically connected in series, wherein each of the plurality of transmit transducer elements comprises an emitting face, wherein at least two of the plurality of transmit transducer elements are mounted with respect to each other such that a respective emitting face of the at least two of the plurality of transmit transducer elements is oriented in a different direction.

12. A transducer assembly comprising:
   at least one transmit transducer element configured to transmit sonar signals into an underwater environment;
   an array of a plurality of receive transducer elements, wherein the array of the plurality of receive transducer elements defines a length and a width with a ratio of the length to the width being at least 3:1, wherein each of the plurality of receive transducer elements is configured to receive sonar returns from the sonar signals and form corresponding sonar return data, wherein at least two of the plurality of receive transducer elements define a same element shape; and a sonar signal processor configured to:
receive the sonar return data from each of the plurality of receive transducer elements of the array;
sum the sonar return data from all of the plurality of receive transducer elements to form summed sonar return data; and
generate sonar image data based on the summed sonar return data, wherein the sonar image data forms a one-dimensional downward sonar image representing the underwater environment beneath the watercraft;

wherein the transducer assembly is configured to be mounted to a watercraft such that the array of the plurality of receive transducer elements is oriented downwardly with the length extending in a first direction that runs generally parallel with a centerline of the watercraft and the width extending in a second direction running from a port side of the watercraft to a starboard side of the watercraft.

13. The transducer assembly of claim 12, wherein the array of the plurality of receive transducer elements comprises at least 8 receive transducer elements.

14. The transducer assembly of claim 13, wherein the sonar signal processor is further configured to:
sum the sonar return data from a subgroup of the plurality of receive transducer elements to form second summed sonar return data, wherein the subgroup of the plurality of receive transducer elements is less than all of the plurality of receive transducer elements; and
generate second sonar image data based on the second summed sonar return data, wherein the second sonar image data forms a second sonar image representing the underwater environment.

15. The transducer assembly of claim 14, wherein the subgroup of the plurality of receive transducer elements includes at least two receive transducer elements that are located generally in the center of the array of receive transducer elements.

16. A system for imaging an underwater environment, the system comprising:
a transducer assembly comprising:
at least one transmit transducer element configured to transmit sonar signals into the underwater environment;
an array of a plurality of receive transducer elements, wherein the array of the plurality of receive transducer elements defines a length and a width with a ratio of the length to the width being at least 3:1, wherein each of the plurality of receive transducer elements is configured to receive sonar returns from the sonar signals and form corresponding sonar return data, wherein at least two of the plurality of receive transducer elements define a same element shape; and
a sonar signal processor configured to:
receive the sonar return data from each of the plurality of receive transducer elements of the array;
sum the sonar return data from a subgroup of the plurality of receive transducer elements to form summed sonar return data, wherein the subgroup of the plurality of receive transducer elements is less than all of the plurality of receive transducer elements; and
generate sonar image data based on the summed sonar return data, wherein the sonar image data forms a one-dimensional downward sonar image representing the underwater environment beneath the watercraft; and a marine electronic device comprising:
a user interface comprising a display;
a marine electronic device processor; and
a memory including computer program code configured to, with the marine electronic device processor, cause the marine electronic device to:
receive the sonar image data from the sonar signal processor; and
cause presentation of the sonar image, based on the sonar image data;

wherein the transducer assembly is configured to be mounted to a watercraft such that the array of the plurality of receive transducer elements is oriented downwardly with the length extending in a first direction that runs generally parallel with a centerline of the watercraft and the width extending in a second direction running from a port side of the watercraft to a starboard side of the watercraft.

17. The system of claim 16, wherein the array of the plurality of receive transducer elements comprises at least 8 receive transducer elements, and wherein the subgroup of the plurality of receive transducer elements comprises at least two receive transducer elements.

18. The system of claim 16, wherein the subgroup of the plurality of receive transducer elements includes at least two receive transducer elements that are located generally in the center of the array of receive transducer elements.

19. The system of claim 16, wherein the sonar signal processor is further configured to:
sum the sonar return data from all of the plurality of receive transducer elements to form second summed sonar return data; and
generate second sonar image data based on the second summed sonar return data, wherein the second sonar image data forms a second sonar image representing the underwater environment.

20. The system of claim 19, wherein the computer program code is further configured to, with the marine electronic device processor, cause the marine electronic device to:
enable selection by a user of at least the sonar image and the second sonar image;
cause, in response to receiving a selection of the sonar image, presentation of the sonar image, based on the sonar image data; and
cause, in response to receiving a selection of the second sonar image, presentation of the second sonar image, based on the second sonar image data.

21. The system of claim 16, wherein the sonar signal processor is further configured to:
process the sonar return data from each of the plurality of receive transducer elements to form two-dimensional (2D) or three-dimensional (3D) sonar return data; and
generate 2D or 3D sonar image data based on the 2D or 3D sonar return data, wherein the 2D or 3D sonar image data forms a 2D or 3D sonar image representing the underwater environment.

22. The system of claim 21, wherein the computer program code is further configured to, with the marine electronic device processor, cause the marine electronic device to:

enable selection by a user of at least the sonar image and the 2D or 3D sonar image;

cause, in response to receiving a selection of the sonar image, presentation of the sonar image, based on the sonar image data; and cause, in response to receiving a selection of the 2D or 3D sonar image, presentation of the 2D or 3D sonar image, based on the 2D or 3D sonar image data.

23. The system of claim 16, wherein the sonar signal processor comprises a multiplexer such that sonar return data from each of the plurality of receive transducer elements can be selected individually for summation.

24. A transducer assembly comprising:

at least one transmit transducer element configured to transmit sonar signals into the underwater environment;

an array of a plurality of receive transducer elements, wherein the array of the plurality of receive transducer elements defines a length and a width with a ratio of the length to the width being at least 3:1, wherein each of the plurality of receive transducer elements is configured to receive sonar returns from the sonar signals and form corresponding sonar return data, wherein at least two of the plurality of receive transducer elements define a same element shape; and a sonar signal processor configured to:

receive the sonar return data from each of the plurality of receive transducer elements of the array;

sum the sonar return data from a subgroup of the plurality of receive transducer elements to form summed sonar return data, wherein the subgroup of the plurality of receive transducer elements is less than all of the plurality of receive transducer elements; and generate sonar image data based on the summed sonar return data, wherein the sonar image data forms a one-dimensional downward sonar image representing the underwater environment beneath the watercraft;

wherein the transducer assembly is configured to be mounted to a watercraft such that the array of the plurality of receive transducer elements is oriented downwardly with the length extending in a first direction that runs generally parallel with a centerline of the watercraft and the width extending in a second direction running from a port side of the watercraft to a starboard side of the watercraft.

* * * * *